United States Patent
Nicholson et al.

(10) Patent No.: US 6,414,650 B1
(45) Date of Patent: *Jul. 2, 2002

(54) SIGN SYSTEM WITH FIELD CHANGEABLE SCREEN SIZE AND MESSAGE

(75) Inventors: Timothy J. Nicholson; John P. Nicholson, both of Shoreview; Gordon M. Melby, Blaine; Steve J. McHenry, Inver Grove Heights; Paul C. Freeberg, South St. Paul, all of MN (US)

(73) Assignee: Addco, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/716,811

(22) Filed: Nov. 20, 2000

Related U.S. Application Data

(63) Continuation-in-part of application No. 09/141,007, filed on Aug. 26, 1998, now Pat. No. 6,150,996, which is a continuation-in-part of application No. 08/833,945, filed on Apr. 14, 1997, now Pat. No. 6,175,342, which is a continuation-in-part of application No. 08/634,031, filed on Apr. 15, 1996, now Pat. No. 5,914,698.

(51) Int. Cl.[7] .................................................. G09G 5/00
(52) U.S. Cl. .............................. 345/1.1; 345/55; 345/84
(58) Field of Search ................................ 345/1, 56, 55, 345/84, 2, 82, 83, 112, 903, 1.1, 2.1, 581; 313/500; 40/576, 908.1

(56) References Cited

U.S. PATENT DOCUMENTS

| | | |
|---|---|---|
| 3,889,147 A | 6/1975 | Groves |
| 4,028,828 A | 6/1977 | Chao |
| 4,050,823 A | 9/1977 | Lee |
| 4,163,332 A | 8/1979 | Salem |
| 4,197,527 A | 4/1980 | Romney |
| 4,445,132 A | 4/1984 | Ichikawa et al. |
| 4,471,350 A | 9/1984 | Chow |
| 4,514,920 A | 5/1985 | Shafrir et al. |
| 4,745,404 A | * 5/1988 | Kallenberg .................. 345/87 |
| 5,020,253 A | 6/1991 | Lie et al. |
| 5,027,112 A | 6/1991 | Ross et al. |
| 5,198,803 A | 3/1993 | Shie et al. |
| 5,230,175 A | 7/1993 | Follis |
| 5,257,020 A | 10/1993 | Morse |

(List continued on next page.)

*Primary Examiner*—Bipin Shalwala
*Assistant Examiner*—Mansour M. Said
(74) *Attorney, Agent, or Firm*—Pattersen, Thuente Skaar & Christensen, P.A.

(57) ABSTRACT

Preferred embodiments of the present invention provide a sign system for creating extremely lightweight, reconfigurable, and changeable signs suitable for outdoor use adjacent to roadways. The system provides adjustable message screen size, electronically changeable messages and alphanumeric adjustable character size of at least 6 inches in height. The system comprises a sign controller and a plurality of interchangeable modules each sealed to be weather resistant. Each module having a display side with a rectangular screen portion, the screen portion having transparent portions with pixel elements positioned behind said transparent portions and within said module. Each module has the pixels arranged in a first matrix pattern and sufficient in number to provide alphanumeric characters and portions of characters of adjustable size of at least 6 inches. Each module having a bit map memory and being individually addressable with respect to other modules. The modules are arrangeable in a rectangular matrix on a support structure without a sign screen enclosure and with the screen portions of the modules defining a sign screen. The screen size reconfigurable by adding or subtracting display modules. The modules in communication with the sign controller to receive bit map data for forming, in conjunction with a plurality of other sign modules comprising a sign screen, and desired message.

20 Claims, 19 Drawing Sheets

U.S. PATENT DOCUMENTS

| | | | |
|---|---|---|---|
| 5,321,505 A | | 6/1994 | Leddy |
| 5,390,093 A | | 2/1995 | Himeno et al. |
| 5,523,769 A | * | 6/1996 | Lauer et al. .................. 345/1.3 |
| 5,634,711 A | | 6/1997 | Kennedy et al. |
| 5,914,698 A | * | 6/1999 | Nicholson et al. ............. 345/1 |
| 6,150,996 A | * | 11/2000 | Nicholson et al. ............. 345/1 |
| 6,175,342 B1 | * | 1/2001 | Nicholson et al. ............. 345/1 |

* cited by examiner

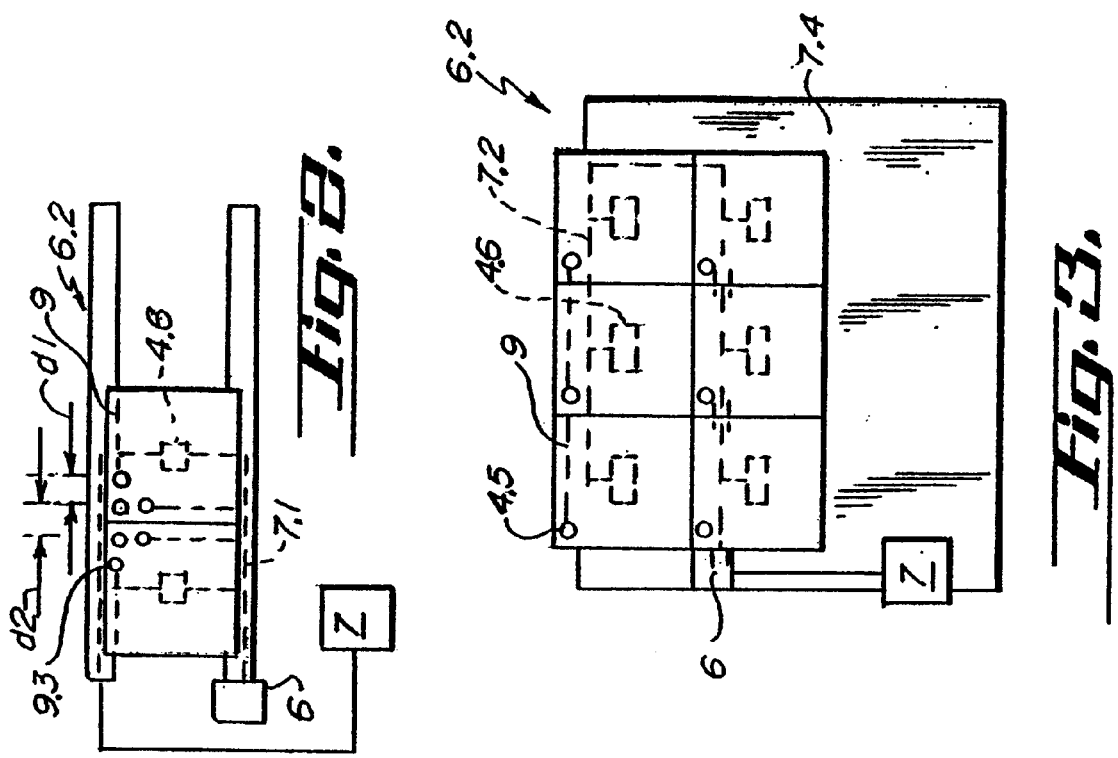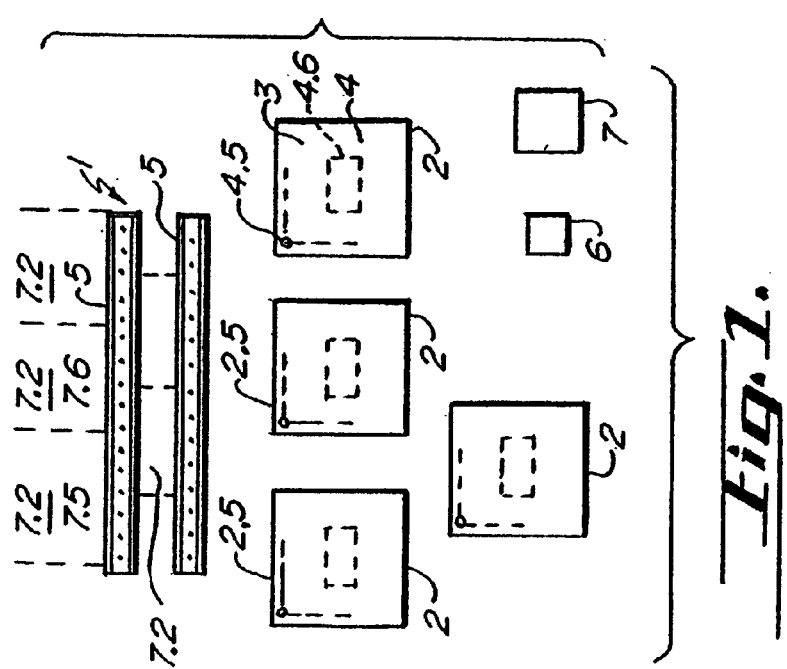

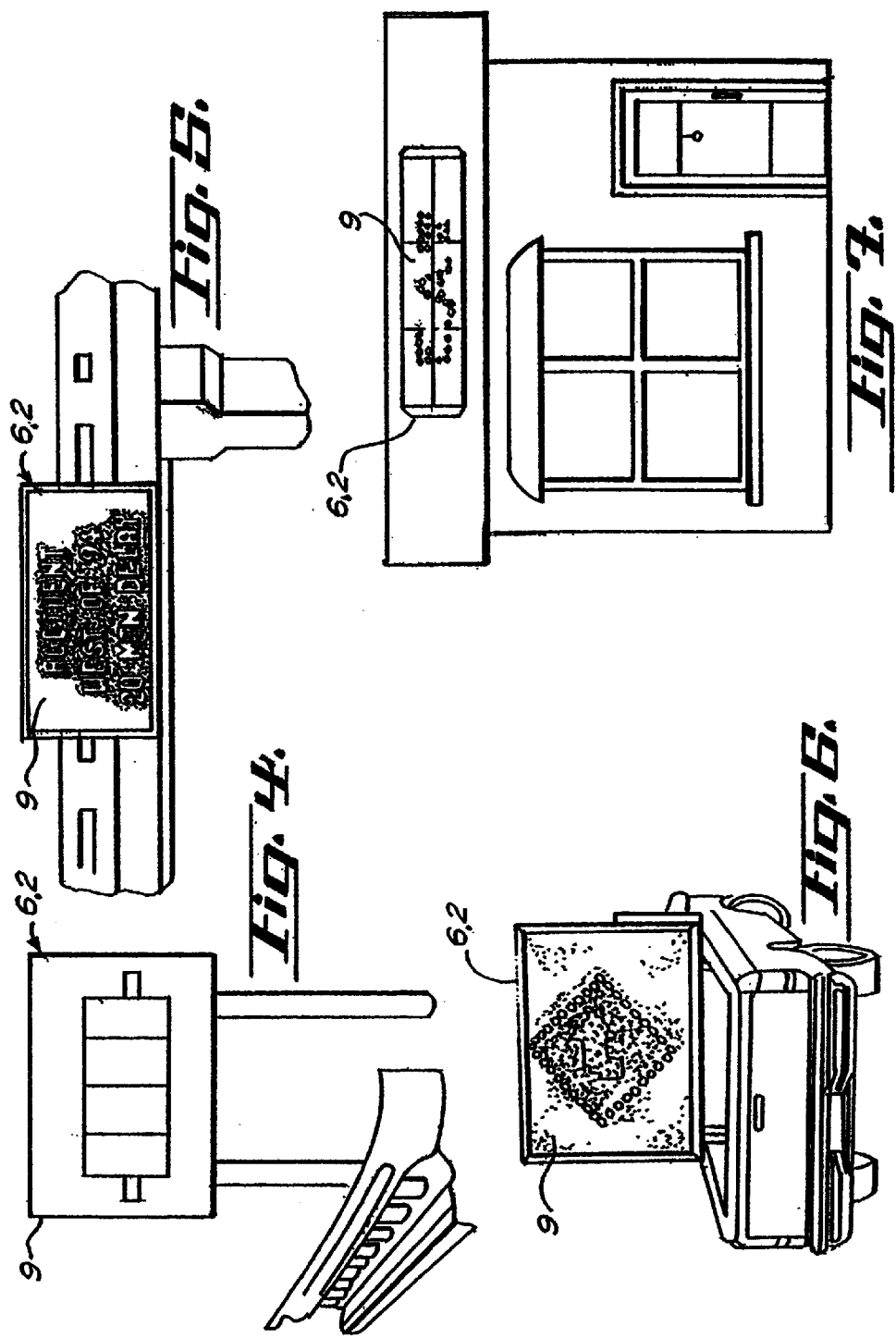

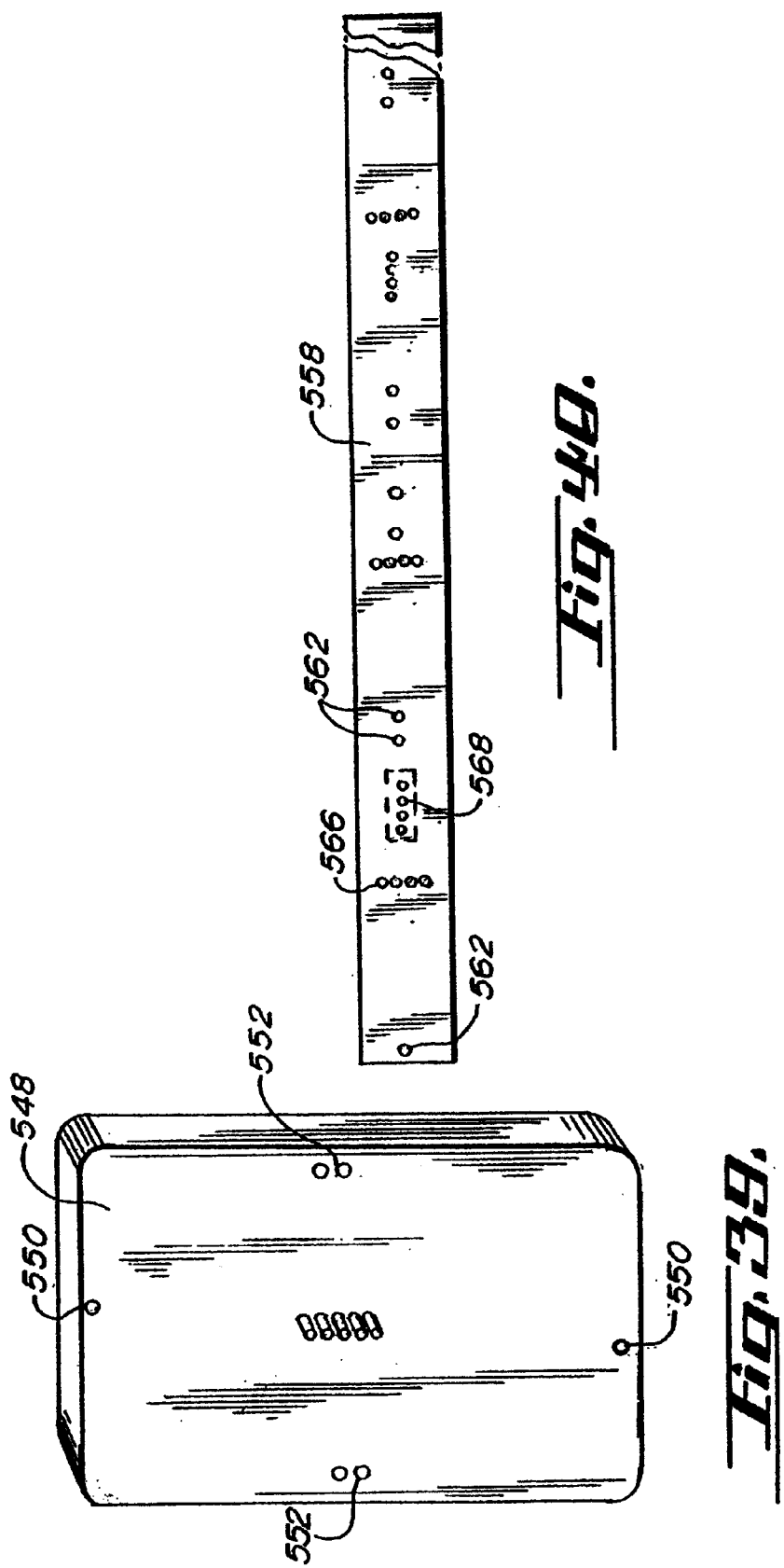

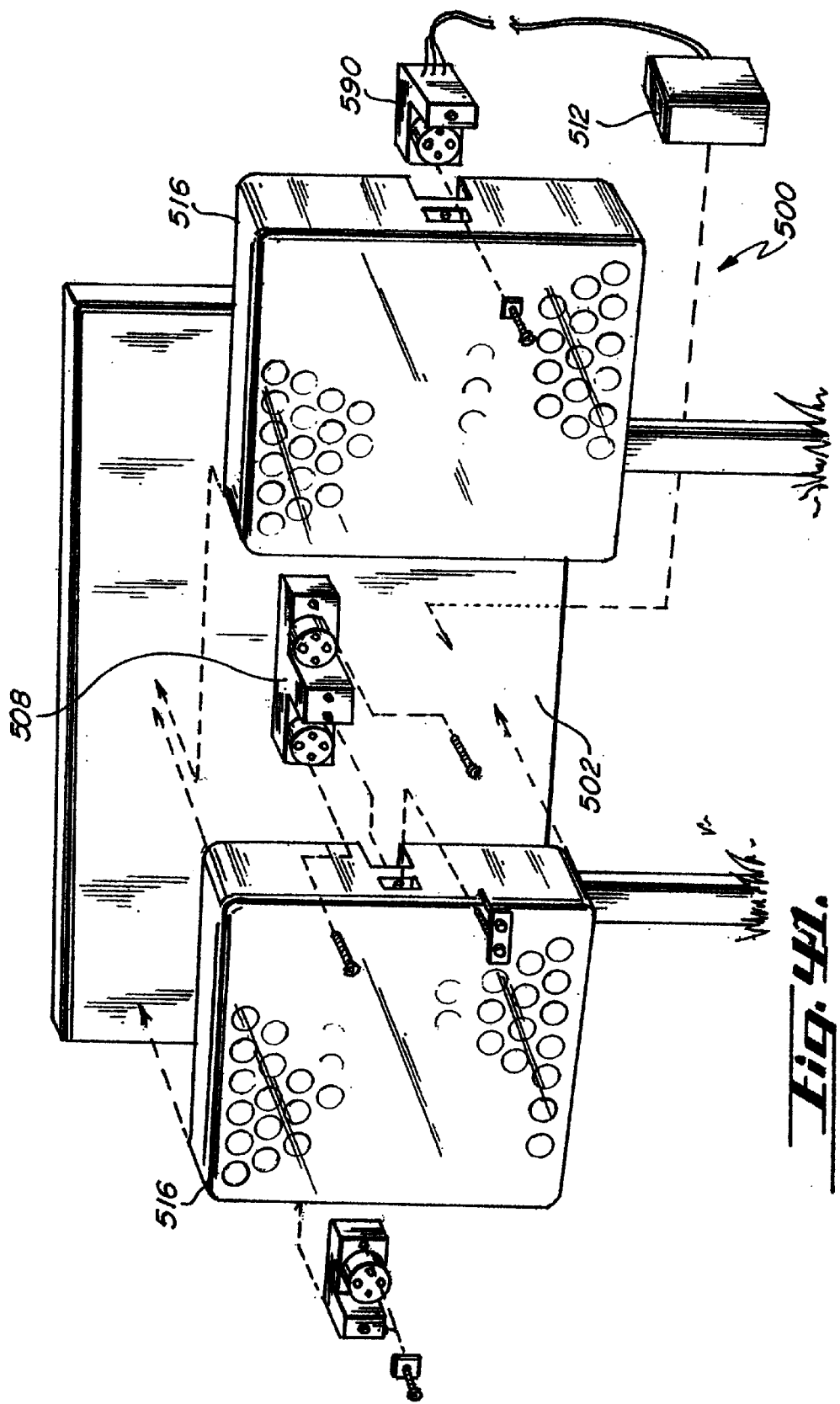

SIGN SYSTEM WITH FIELD CHANGEABLE SCREEN SIZE AND MESSAGE

This is a continuation-in-part of Application Ser. No. 09/141,007, now U.S. Pat. No. 6,150,996 filed Aug. 26, 1998, issued Nov. 21, 2000, which was a continuation-in-part of Application Ser. No. 08/833,945 now U.S. Pat. No. 6,175,342, filed Apr. 14, 1997, which was a continuation-in-part of Application Ser. No. 08/634,031, now U.S. Pat. No. 5,914,698 filed Apr. 15, 1996. All of the above patents and their respective applications are incorporated herein by reference.

BACKGROUND OF THE INVENTION

The present invention relates to apparatus and methods relating to signs suitable for outdoor use and with changeable message screens. More particularly, the invention relates to signs suitable for roadside and for providing messages viewable and readable at a distance of at least 200 feet.

Prior art changeable message signs with field changeable message screens suitable for roadside use have been cumbersome and expensive due to the conventional methods of constructing the signs. Such signs conventionally utilize a single large sign enclosure for framing and containing a matrix of changeable pixels which form the screen that displays the changeable message. The protection of the pixels, which are typically LED's and/or mechanically flipped fluorescent panels, as well as associate circuitry, is typically provided by the single large screen enclosure and an integral and unitary screen panel that is transparent or has transparent portions and which covers the entire screen. In the prior art signs the screen enclosure defines and limits the size of the message screen.

The circuitry for driving the pixels in these prior art signs is hardwired in a generally permanent fashion within the sign enclosure for servicing the sign. In portable signs the access door typically includes the screen panel which is swung upwardly and propped open for working on the circuitry and/or pixels.

These prior art signs utilizing LED's and/or flip panels as the pixels may be constructed of a number of individual circuit boards with the LED's extending therefrom. The circuit boards are arranged in the desired message screen shape and size within the rigid steel sign enclosure. Typically, the sign controller will either connect independently through multiple conductors from the sign controller to each circuit board and associate LED's or there will be multiple ribbon cable and associated LED's or there will be multiple data lines in a daisy chain arrangement to each circuit board.

The sign enclosures are specifically sized for the desired message screen size. A sign controller, either within the screen enclosure or separately enclosed, operates to control the changeable message. Each of the circuit boards is assigned an address and the sign controller will typically utilize ribbon cable and connectors with multiple data conductors to send parallel data to the individual circuit boards for displaying the desired message. See U.S. Pat. No. 4,197,527 to Romney which discloses an outdoor modular sign. As in other prior art signs, Romney discloses the use of extensive cabling and wire harnesses for connecting to and providing control signals to the modules. Moreover, the modules in Romney, as in any other art outdoor signs utilizing modular circuit board arrangement of which the applicants are aware, are enclosed in a sign screen enclosure; thus the sign screen is not expandable. The support and mounting structure for the modules are thus sized for and typically part of such sign enclosures. Moreover any such mounting structure will typically provide only mechanical support for the mounting of the modules. Electrical connections are accomplished separately from the mechanical attachment to the sign enclosure and such electrical connections provide no mechanical support for the module.

As a result of the configurations of conventional prior art exterior changeable message signs, the pixel elements and the circuitry for the pixels are not serviceable from the front of the sign screen. Moreover, typically such prior art signs are not user serviceable and where such service is performed, the sign screen enclosure must be entered or opened thereby exposing all internal circuitry and pixel elements to the weather. This can cause difficulty in field servicing the sign screens particularly during rain or snow showers.

Much, if not the majority of the weight and bulk of traditional outdoor changeable message signs is in the screen enclosure. A breach of the enclosure, such as a crack or hole in the transparent screen panel subjects the entire screen circuitry and pixels to the elements, particularly moisture. Moreover, the size and weight of the screens necessitate heavy machinery, for example a crane, to install such signs.

Moreover, due to the massive weight, principally from the enclosure, dropping the changeable message screens can cause extensive damage to the sign screen or other property. Also, the significant bulk, weight, and rigid metal structure presents a hazard to personnel during the installation of such signs and to motorists who might collide with same.

Moreover, the weight and bulk of traditional outdoor changeable message signs requires a large and expensive support structure to support the enclosure. This of course increases the cost and labor for transportation and erection of such signs.

Moreover, the steel enclosures of the prior art outdoor changeable message signs often require ancillary cooling equipment. This of course, increases the weight, complexity, maintenance issues, and cost of the signs. Moreover, due to the size of the enclosures, effective weatherproofing was difficult. Hermetic sealing of such enclosures is generally impossible.

Thus, the prior art does not disclose an outdoor electronic message sign with characters viewable at a reasonable distance for reading, for example, at least 200 feet away, and which is easily changeable both with respect to the message and with respect to the screen size.

Conventional prior art exterior changeable signs are labor intensive and expensive to manufacture requiring fabrication of a steel screen enclosure, mounting of multiple boards with LED's or other pixel elements inside the steel enclosure, hardwiring of the components and connection to and enclosure of the sign controller. Typical lead time to manufacture such signs is four to five weeks.

SUMMARY OF THE INVENTION

Preferred embodiments of the present invention provides a sign system for creating extremely light weight, reconfigurable, and changeable signs suitable for outdoor use adjacent to roadways. The system, in preferred embodiments can provide adjustable message screen size, electronically changeable messages and adjustable alphanumeric character size of sufficient size to be readable by the average motorist at 150 to 200 feet or more. The system generally comprises a sign controller and a plurality of interchangeable modules each closed or sealed to be weather resistant. Each module of preferred embodiments having a display side with a rectangular screen portion, the screen portion having transparent portions with pixel elements positioned behind said transparent portions and within said module. Each such module has the pixels arranged in a first matrix pattern and sufficient in number to provide alphanumeric characters of and portions of characters of adjustable size of at least 6 inches. Each such module having a bit map memory and being individually addressable with respect to other modules. The modules are arrangeable in a rectangular matrix on a support structure without a sign screen enclosure and with the screen portions of the modules defining a sign screen. The screen size is thus reconfigurable by adding or subtracting display modules. The modules are in communication with the sign controller to receive data for displaying, in conjunction with a plurality of other sign modules, a desired message. The microprocessor allows diagnostic data as to the status of the display module and specifically the pixel elements to be sent to the sign controller.

In a preferred embodiment, each module is comprised of a plastic hermetically sealed enclosure with an open interior and with the module circuitry and pixel elements mounted therein. The modules may be connected to a data output from sign controller by one or more conductors running behind, above, below, or through the display modules. Or communication can be by conductive or optical coupling. The sign controller can thus be remote from the sign screen with minimal numbers of wires extending therebetween.

An object and feature of preferred embodiments is that signs of any desired size can be field constructed by users. Similarly, the size of a message can be changed by the user. The sign is user and field reconfigurable both with respect to screen size and message.

An additional object and feature of preferred embodiments, according to a preferred embodiment, is that each module is extremely light weight and can easily be manually positioned in place by a single person. The weight of conventional changeable message sign with comparable screen size is greater by a magnitude of ten or more. In the embodiment utilizing a track for mounting of display modules the entire sign can be field assembled by a single worker.

An additional object and advantage of preferred embodiments is that each module may be hermetically sealed thereby providing superior weatherproofing over conventional signs.

An additional object and advantage of preferred embodiments is that repairs of a sign constructed from and by said system may be repaired simply by replacing individual modules.

An object and feature of preferred embodiments of the invention is that pursuant to a customer request essentially any size sign can be immediately assembled at the factory from a minimal number of modular sign parts. Thus eliminating traditional sign construction delays of 4–5 weeks. Such a sign can be easily assembled simply by mounting a desired or specified number of display modules on a suitable support. Alternately, the component parts can be shipped in disassembled form for assembly on site by a customer. Moreover, the shipment and transportation of signs according to the invention is easier and less expensive than traditional prior art signs due to their significantly lighter weight and less bulk.

Another object and advantage of preferred embodiments of the invention is that signs according to the invention can utilize many already existing structures, such as standard sheet metal highway signs which would not be usable for conventional prior art changeable message signs due to the weight and bulk of such signs. Moreover, signs according to the invention, can be easily removed from such preexisting structures with minimal or no damage to the structures. Thus a portable changeable message sign according to the invention can be installed in many locations on preexisting structures where if a conventional portable message sign would be utilized same would have to be the trailer version.

Another advantage and feature of preferred embodiments of the invention is that where a pixel is faulty in a particular sign assembly and where the pixel is part of the message, the modules may be easily rearranged, even at the usage site, to a configuration such that the faulty pixel is not part of the displayed message.

Another object and advantage of preferred embodiments of the invention is that the cost to manufacture signs in accordance with the invention are less than traditional changeable highway signs per unit of display area.

Another object and advantage of preferred embodiments of the invention is that the signs may be field assembled in essentially any weather conditions and may be assembled by a single individual minimizing transportation costs.

Another object and advantage of preferred embodiments of the invention is that no separate screen enclosure is utilized or needed. Thus, the size of the sign screen is not limited by the screen enclosure.

Another object and advantage of preferred embodiments of the invention is that the signs present minimal hazard to installers, compared to traditional changeable message signs, due to the instant invention's light weight. Moreover, less hazard is presented to motorists who collide with such signs.

BRIEF DESCRIPTION OF THE DRAWINGS

FIG. 1 is a schematic view of a sign system according to the invention.

FIG. 2 is a schematic view of a changeable message sign according to the invention.

FIG. 3 is a schematic view of a changeable sign according to the invention.

FIG. 4 is a perspective view of a sign according to the invention mounted on an existing highway sign.

FIG. 5 is a portrays a sign according to the invention mounted on an overpass.

FIG. 6 depicts a truck mounted sign according to the invention.

FIG. 7 depicts a building mounted sign according to the invention.

FIG. 23 is a perspective view of an alternate embodiment of the mounting track and an alternate connection between adjacent track segments.

FIG. 39 is a rear perspective view of a display module according to the invention.

FIG. 40 a front elevational view of a mounting track suitable for use with the module of FIG. 39 allowing use of the module in two orientations.

FIG. 41 is a perspective exploded view of a further embodiment of a sign in accordance with the invention herein.

DETAILED SPECIFICATION

Figure 8:
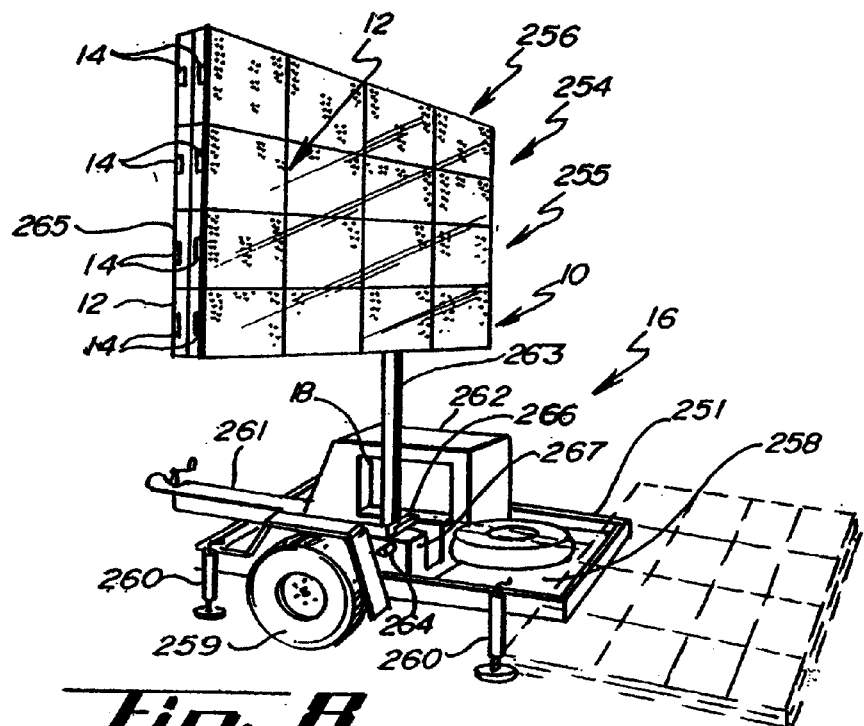
FIG. 8 is a perspective view of the modular sign mounted on a moveable mounting structure.

Referring to FIG. 1, a sign system according to the invention is illustrated in schematic and is generally designated with the numeral 1. The system 1 principally comprises a plurality of identical display modules 2, mounting structure configured as mounting track 5, a sign controller 6, and a power supply 7. The sign controller and power supply may be combined. Each display module has an enclosure 2.5, a display side 3 with a screen portion 4, and pixel elements 4.5, and internal enclosed circuitry 4.6 contained within the enclosure. The mounting track has a plurality of module positions or slots 7.2 shown as the areas between the dashed lines. Note that a track can be configured to have multiple slots in a limited length of track as illustrated by the slots shown above and below the upper track section of FIG. 1. The track can be configured, as disclosed in the discussion below, to have almost infinitely variable slot locations. Each slot has mechanical attachment structure 7.5 for supporting the modules on the mounting track and electrical connection structure 7.6. The electrical connection structure includes mechanical attachment structure for secondary or exclusive support of the display module. "Track" when used herein refers to a single track section, multiple track sections combined, and multiple separate track sections. Moreover "structure" when used herein refers to a single structural section, multiple structural members attached, and multiple separate structural members.

Referring to FIGS. 2 and 3, the sign system is utilized to construct signs 6.2 of various configurations. Each display unit is electrically connected to the sign controller 6 and power supply 7 both of which may be enclosed in separate units, together in one unit in a display module. The connectors can be through conductors 7.1 in the mounting tracks, above, below, or behind the display modules as illustrated in FIG. 3. In FIG. 3 the support structure 7.4 may be an existing structure such as a wall. Significantly the individual screen portions 4 of each module combine to form a sign screen 9 which in FIG. 2 is two screen portions in size and in FIG. 6 is six screen portions in size. Each screen portion of each module has an array 9.2 of pixels with a distance d1 between adjacent pixels. The display modules are configured to also have a distance d2, which is substantially the same as d1, as a distance between adjacent pixels in adjacent modules.

Referring to FIGS. 4, 5, 6, 7, and 8, various configurations of changeable message signs 6.2 according to the invention in various applications are depicted. Each of said signs have a sign screen 9 defined by the screen portions of the adjacently amounted exteriorly exposed display modules.

Referring to FIG. 8 specific details of one embodiment will be discussed. The modular sign 10 is trailer mounted and generally comprises a plurality of connected display modules 12, a plurality of mounting tracks 14 mounted on a mounting structure 16 and a sign controller 18. As illustrated in FIG. 8 the mounting tracks 14 may be mounted back-to-back to form a two sided sign 10.

A typical sign 10 may be made from a plurality of display modules 12 on mounting tracks 14 mounted parallel to each other and attached to the mounting structure by clips 270. Each display module 12 mounted on the mounting track 14 may display one or more characters or a portion of a character and is vertically aligned with the display modules 12 on adjacent mounting tracks 14 to form a pattern of display modules 12 on the sign 10. It should be understood, the mounting tracks 14 may be mounted in a vertical or horizontal orientation. For purposes of illustration, the sign 10 will be discussed with reference to horizontally mounted mounting tracks 14.

The supporting structure 16 may comprise a trailer 251, having a platform 258 supported by wheels 259 rotatably mounted on the platform 258 as is well known in the art of trailers. Trailer 251 may have one or more jack stands 260 which are extendable to engage the ground to hold the platform 258 in a fixed position. A vehicle connector 261, such as a trailer hitch, may be used to move the mounting structure 16 to a proposed sign 10 installation location. An enclosure 262 on platform 258 may be used to provide environmental protection for sign controller 18.

Sign support 263 is attached to and supports sign plate 265 which may have a front side and a back side. The sign support 263 may be pivotally attached to the platform 258 at pin 264 and held in a vertical position by lock 266 and side supports 267. It should be understood that pin 264 extends into both side supports 267 and through the sign support 263.

Trailer 251 may also be used to transport sign 10 by removing lock 266 and pivoting sign support 263 about pin 264 until sign support 263 is in the horizontal position, as shown in dotted outline. Vehicle connector 261 is attached to a vehicle (not shown) such as a tractor, car or truck, the jack stands 260 are retracted to raise the jack feet to a non-engagement position with the ground or road surface. Lock 266 may be replaced across the side supports 267 to hold the sign support 263 in the horizontal position. It should be understood that sign 10 may alternatively be attached to a bridge, existing highway sign, building or other structures.

Figure 9:
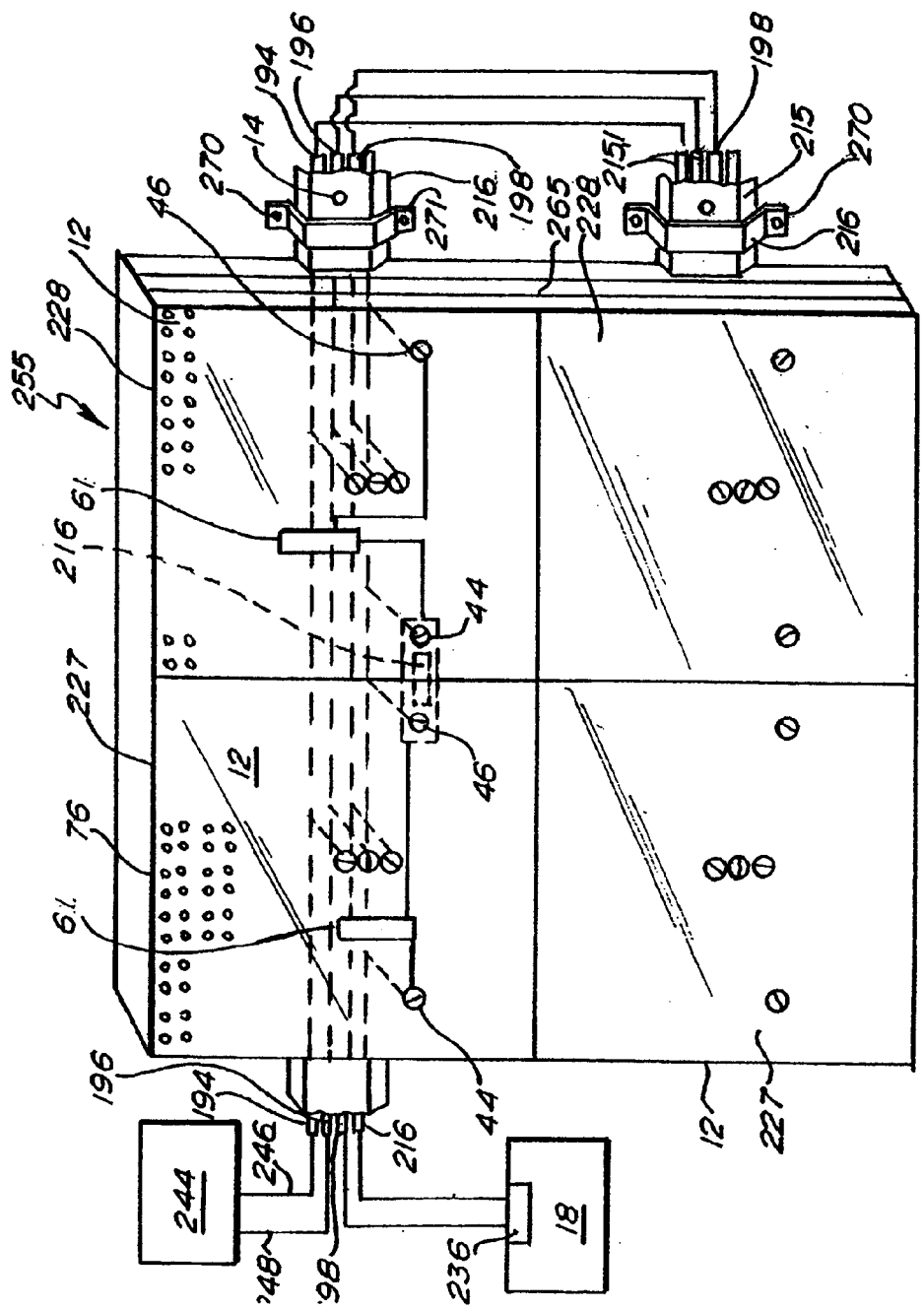
FIG. 9 is a perspective view of four display units mounted in a matrix pattern.
Figure 11:
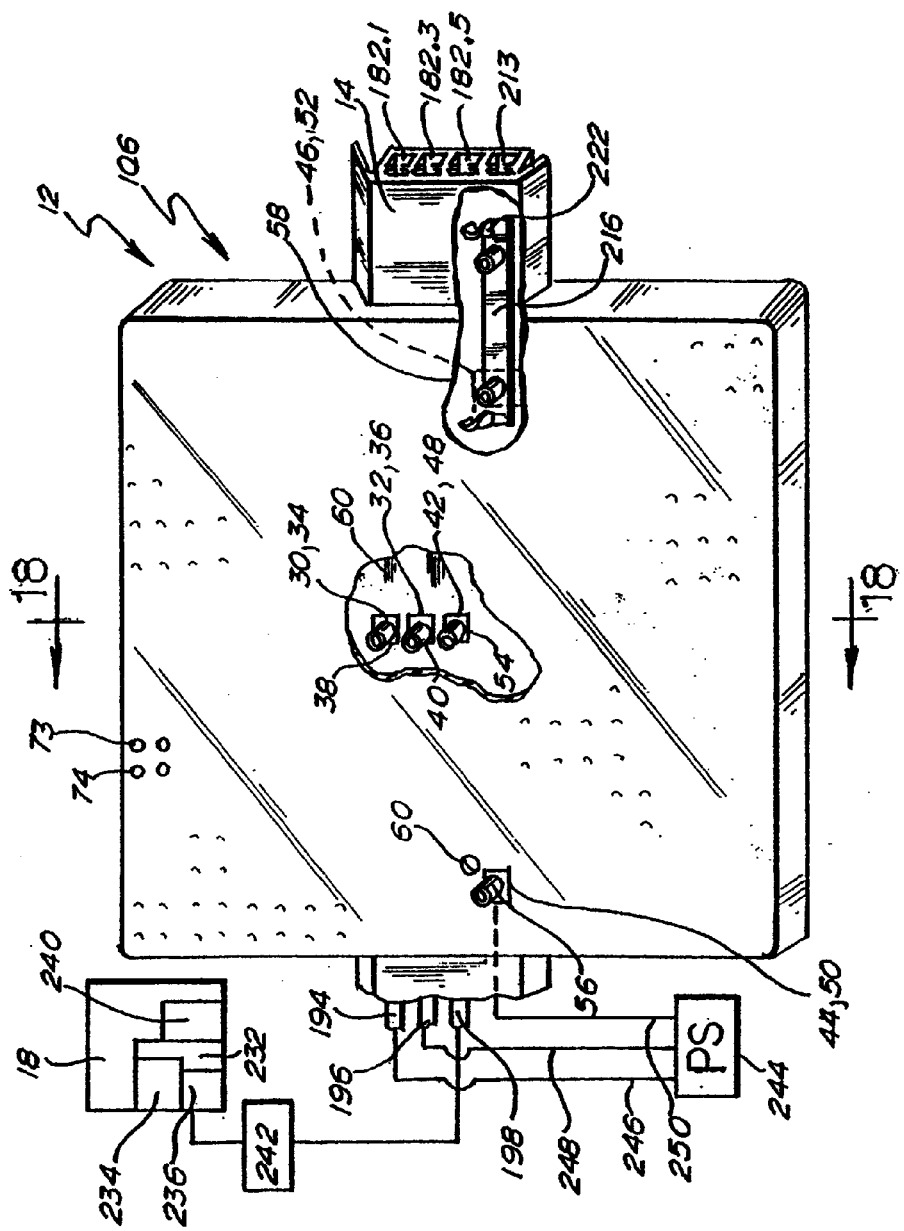
FIG. 11 is a diagrammatic view of the connections to a mounting track.

Referring to FIGS. 8, 9 and 11 the display modules 12 are assembled to form a sign 10. The sign controller 18 is attached to a communication conductor 198 of each mounting track 14, and may have several information lines connected to separate mounting tracks 14. Alternatively, the mounting tracks 12 may have the communication conductor 198 wired together in series. The wires connecting the sign controller 18, including a power supply 244 may be run inside the sign support 263.

Power supply 244 is attached to first power conductor 194 and second power conductor 196 by wires 246 and 248. Power supply 244 may provide a direct current voltage source on first power conductor 194, and a ground connection to second power conductor 196.

Information to be displayed is input into sign controller 18 through information input 234. This information is stored in memory 232. A serial information output terminal 236 on sign controller 18 is used to connect to communication conductor 198 on the mounting track 14. Sign controller 18 may also be connected to a second communication connector 44 on display module 12, via line 231.

Referring to FIG. 11, the sign controller 18 may be a general purpose computer, such as available from Hewlett Packard, comprising a memory 232, an information input 234 and a plurality of information outputs 236 such as serial communication ports, and a processor 240. One information output 236 is connected to the communication conductor 198 of each mounting track 14. Alternatively, the communication conductors 198 in sign 10 may be wired in series and connected to only one information output 236. Controller 18 communicates to each display module 12 in a multi-drop scheme to address each display module 12 and display information on sign 10 as will be clearly understood by a person familiar in the art of communication and display of information. The processor 240 in the controller 18 is connected to the memory 232, the information input 234 and the information output 236. A modem 242 may be mounted intermediate each information output 236 and the communication conductor 198 of the mounting track 14. The sign controller 18 has circuitry configured to address each display module and create addressed bit maps of information to be displayed on the sign 10. Furthermore, the sign controller 18 has circuitry to reset all of the addresses of the individual, interchangeable display modules 12 and readdress each display module 12 individually.

Figure 12:
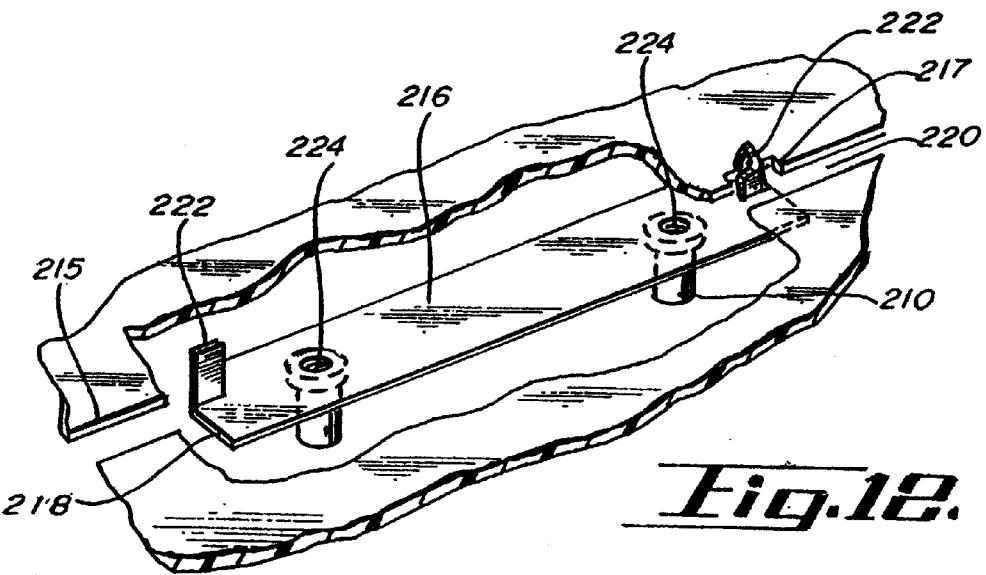
FIG. 12 is a break away view showing a jumper in the mounting track.

As shown in FIGS. 9, 11 and 12, the respective conductors in adjacent first and second display modules 227, 228 are electrically interconnected in series by jumpers, for example jumper 216, to facilitate assigning an address to each display module 12. Each display module has two connectors for attachment to the jumpers 216. A connector 44 is located approximate the left side of a display module and a connector 46 is located approximate a right side of a display module. The connectors 44, 46 in two adjacent display modules can be interconnected by sliding a jumper 216 along the jumper channel 213 and aligning a fastener hole 224 (shown in FIG. 5) with a connector 44, 46, and threadably attaching the connector to the fastener hole 224 with a mounting screw 160. The adjacent display module is similarly connected, by aligning a second fastener hole 224 in the jumper 216 with the connector and threadably securing a mounting screw 160 through the connector into the fastener hole 224.

Figure 17:
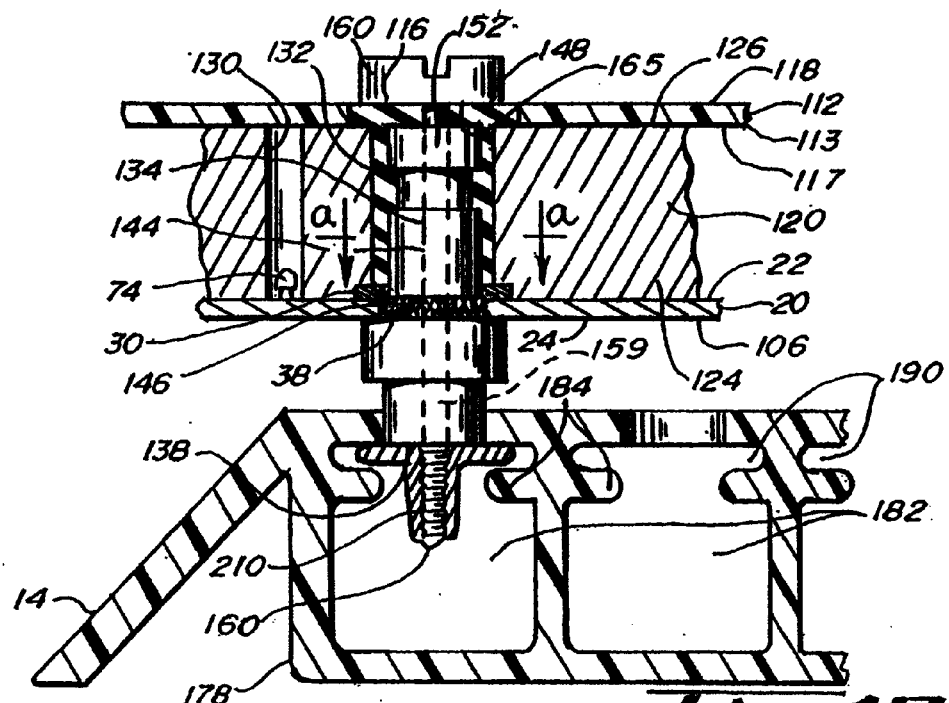
FIG. 17 is a detail section showing a mounting screw connecting the first power connection to the first power conductor.
Figure 18:
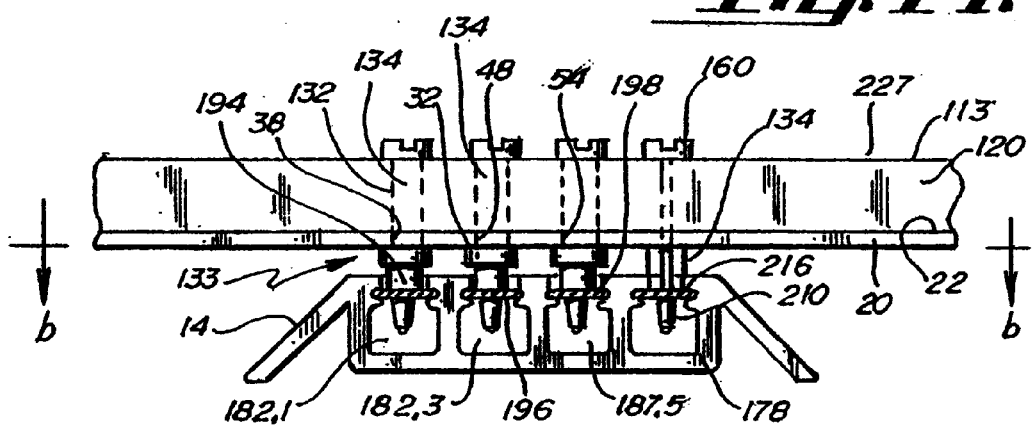
FIG. 18 is a detail section view taken at approximately 11—11 of FIG. 4.

FIGS. 17 and 18 illustrate a cross section view of the connectors in the display module 12, engaged to the respective conductors in the mounting track 14, wherein electromechanical fasteners 133 comprising mounting screws 160 are used to make the various connections. A mounting screw 160 extends through the screw passageway 152 and threadably engages the self-clinching fastener 210 in the first end 218 of a jumper 216, illustrated in FIG. 12. As could be understood, the mounting screw 160 urges the knurl face 138 of the standoff 134, connected to the communication connector 44, to engage the jumper 216, forming a mechanical and electrical connection. The jumper 216, connected to first display module 227, extends along the mounting track 14 to the adjacent display module 228. The tabs 222 on the jumper 216 extend through the slot 215 in track 14 and are bent over to lie flush along the outside of the housing cover plate 191 or twisted to engage notch 217 and retain the jumper 216 in place as illustrated in FIG. 12.

As illustrated in FIG. 9, the connector 46 of the left-most first display module 227 on mounting track 14 is connected to connector 44 of the adjacent second display module 228 as described above for positionally locating each display module 12. Each additional display module 12 along the mounting track 14 is similarly attached to the adjacent display module 12 on mounting track 14. The connector 44 of the left-most first display module 227 is connected to either the sign controller 18 or the power supply 244.

Figure 10:
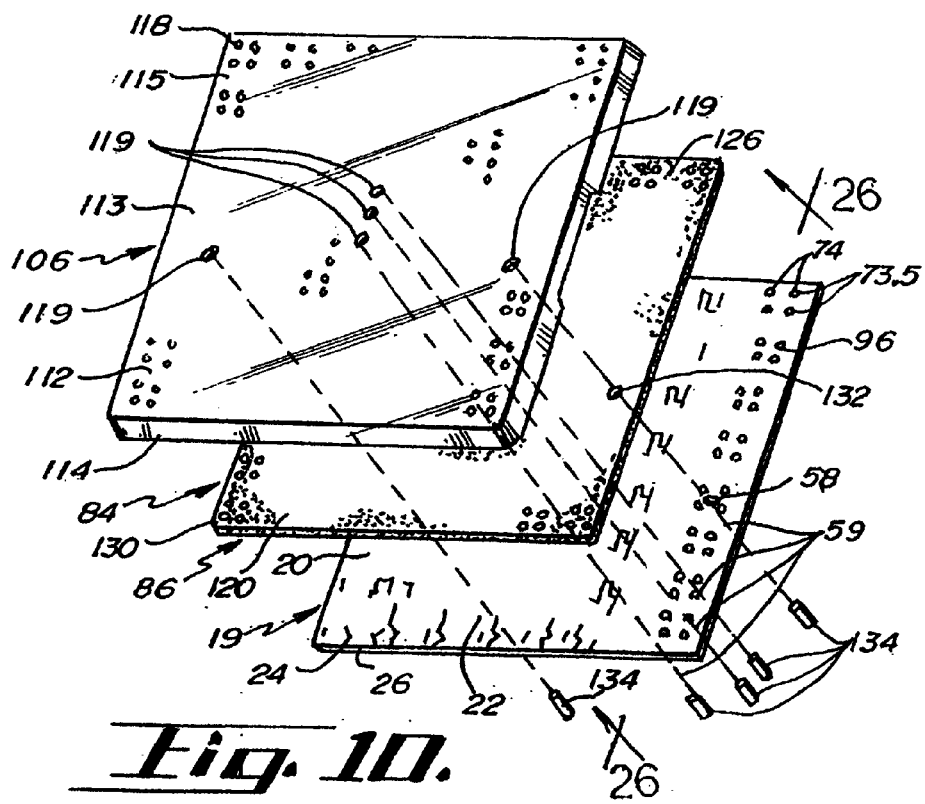
FIG. 10 is an exploded view of a display unit.

Referring to FIGS. 10 and 17, the display modules 12 are electrically interchangeable and comprise a panel 19 such as a circuit board 20 having a display side 22, a back side 24 and an exterior edge portion 26 defining the shape of the circuit board 20. Electrical connecting traces may be conventionally formed on the circuit board 20 to electrically connect elements mounted on the circuit board 20.

Referring to FIG. 11, a first power connector 30 and a second power connector 32 are on the circuit board 20 and may extend from the back side 24 through to the display side 22 as illustrated in FIG. 17. The first and second power connectors 30, 32 respectively, are electrically isolated from each other and comprise first and second conductive pads 34, 36 respectively. The first and second conductive pads 34, 36 respectively comprise a metallic material such as tin, gold or silver and are solderably connected to the electrical conducting traces as is well known in the art of manufacturing circuit boards. The conductive pads 34, and 36 each have a mounting fastener hole extending through the circuit board 20 from the back side 24 to the front side 22.

A third connector 42 is mounted on the circuit board 20 in a manner similar to connectors 30 and 32. Third connector 42 is used to connect to the communications conductor 198, and is mounted essentially the same as the other connectors. Third connector 42 has an associated conductive pad 48 made from a metallic material such as gold or silver which is soldered to the electrical conducting traces on the circuit board 20.

Referring to FIGS. 17 and 18, a plurality of mounting screws 160 and standoffs 134 are used to mechanically mount the display modules 12 and electrically connect the display modules 12 for power and communication. The standoffs 134 extend between the circuit board 20 and the translucent cover 112.

Figure 19:
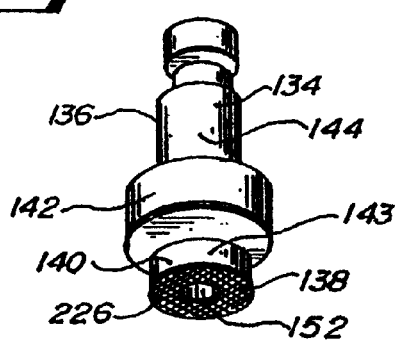
FIG. 19 is a perspective view of a standoff.
Figure 20:
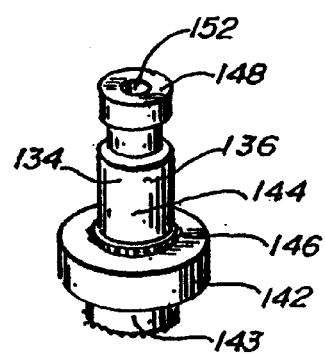
FIG. 20 is a perspective view of a standoff.

As illustrated in FIG. 19 and 20, each standoff 134 comprises a body 136 having a knurl face 138 on a first end, a shoulder 142 spaced from the knurl face 138 on the body, a neck 143 intermediate to the knurl face 138 and the shoulder 142 and a shank 144 extending from the shoulder 142 to the second end of the body. A straight knurl portion 146, is formed on the shank 144 adjacent the shoulder 142. A cover face 148 is on the second end of the body. A screw bore 152 extends through the body of the standoff 134 from the second end to the first end.

Figure 15:
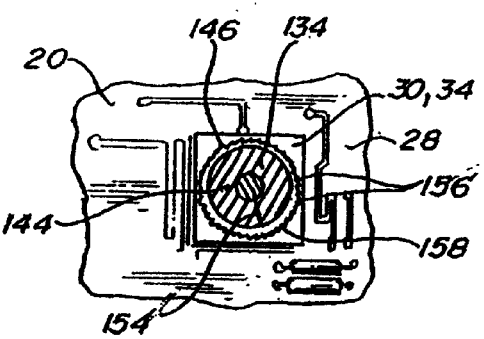
FIG. 15 is a view showing a standoff connected to a first mounting hole.

As illustrated in FIGS. 17 and 18, each standoff 134 is attached by inserting the second end of the body into a mounting fastener hole in the circuit board 20 from the back side 24. The assembly of the standoff 134 and circuit board 20 will be further described with respect to one of the mounting fastener holes. The shank 144 of the standoff 134 has a radius 154 from the shank axis sized to securely fit in the mounting fastener hole as illustrated in FIG. 15. The straight knurl portion 146 of the shank 144 has a plurality of splines 156 extending radially from the shank 144. The splines 156 extend beyond the radius a length sufficient to engage the circuit board 20. Each spline 156 makes a physical and electrical connection between standoff 134 and a conductive pad 34. It should be understood, the electrical connection between standoff 134 and a conductive pad is gas tight and preserves the integrity of the connection by not allowing moisture in between the standoff 134 and the pad.

Referring to FIG. 10, the circuit board 20 is supported on the shoulder 142 of the standoff 134 which bears against the back side 24 of the circuit board 20. The cover face 148 of the standoff 134 is flush with the translucent cover 112 having the screw bore 152, axially aligned in a screw hole in the translucent cover 112. In this arrangement, the screw bore 152 in the standoff 134 which extends through the mounting hole and opens through the knurl face 138 defines a screw passageway through display module 12 from outside the translucent cover 112 and through the circuit board 20. The neck 143 spaces the knurl face 138 from the back side 24 of the circuit board 20. It should be understood that the cover face of the standoff 134 may be sealingly attached to the translucent cover 112. The sealing attachment may be with a sealant 116 applied intermediate to the standoff 134, the spacer 120 and the translucent cover 112 or may be an o-ring on the cover face or similar means known in the art of sealingly attaching two elements.

A separate mounting screw 160 is inserted into the display module 12 through each screw bore 152. In assembly, the end of the mounting screw 160 is inserted through the screw bore 152 of the standoff 134. The threaded portion of the mounting screw extends from the knurl face 138, of the standoff 134. The driving head 165 bears against the cover face 148 of the standoff 134.

Referring to FIGS. 16–18 and 28, the display modules 12 may be connected to each other and the mounting structure 16 by a mounting track 14 comprising a plurality of track segments 172. The mounting track 14 may comprise a housing 176 having a housing base portion 178 and a housing cover portion 180. The housing base portion 178 is extruded to form a plurality of longitudinal conductor channels 182 extending the length of the base 178 illustrated as conductor channels 182.1, 182.3, 182.5, and 182.7 respectively. A fastener chamber 190 is defined in each longitudinal conductive channel 182 intermediate to the bottom of the base 178 and side ribs 184.

Figure 16:
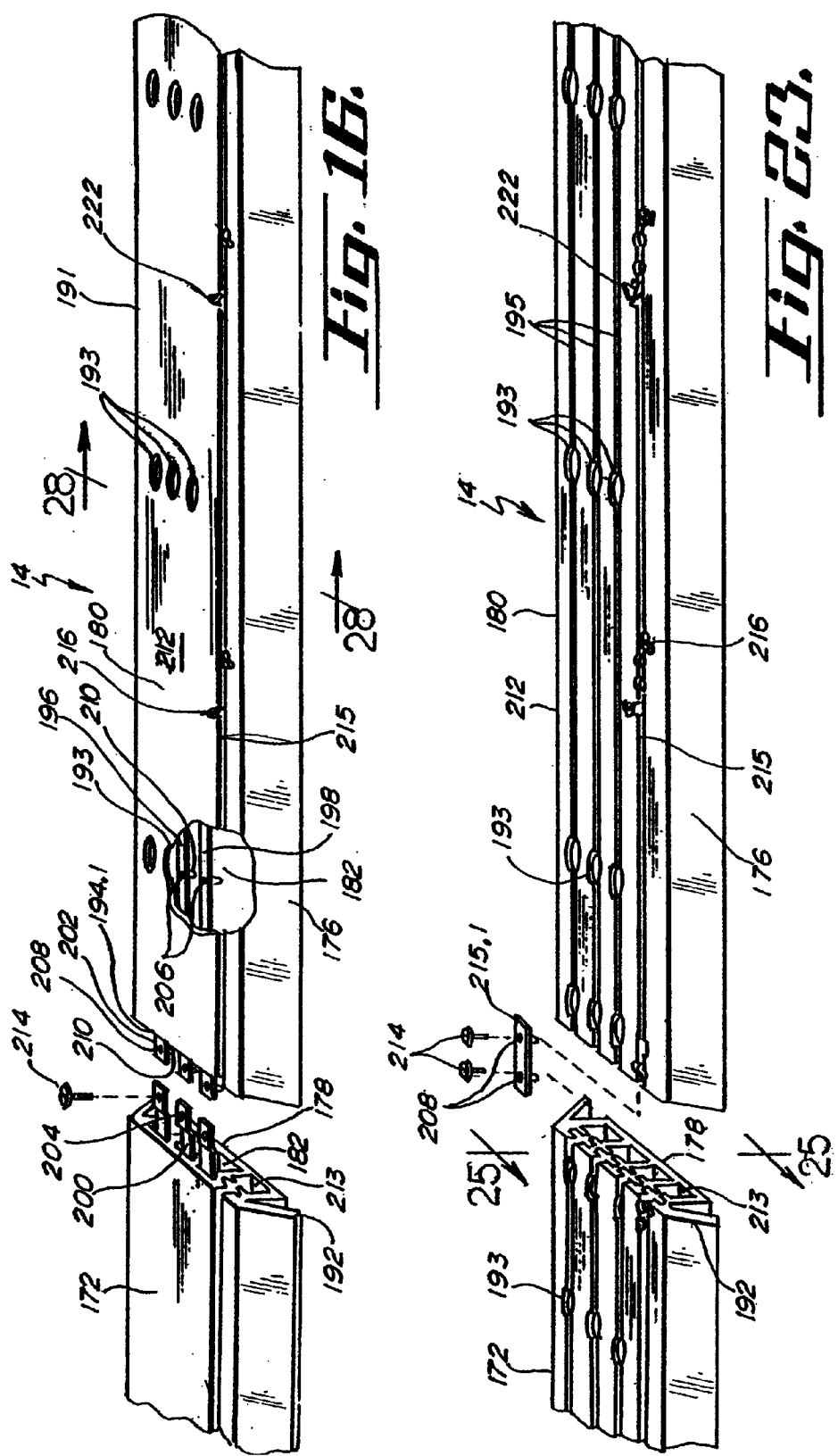
FIG. 16 is a perspective view of portions of two mounting track segments.

Referring to FIGS. 16 and 23, the housing cover portion 180 has a plurality of fastener holes 193 formed therein. The fastener holes 193 in the housing cover portion 180 extend through the housing cover plate 180 and open into a longitudinal conductor channel 182. The fastener holes 193 in the housing cover portion 180 are formed in a predetermined pattern along each longitudinal conductor channel 182 and are sized to allow the neck 143 of standoff 134 to extend through housing cover plate 181 as illustrated in FIG. 17.

In an alternative embodiment illustrated in FIG. 23, slots 195 may be formed in housing cover plate 180 in communication with each longitudinal conductor channel 182. In this embodiment, fastener holes 193 are formed in slots 195.

Figure 28:
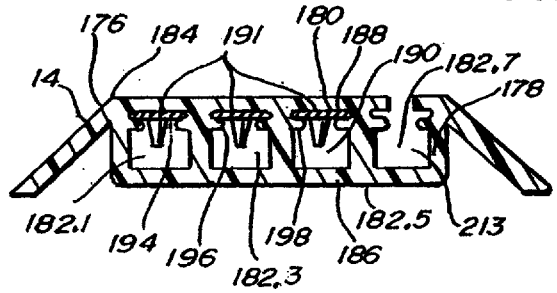
FIG. 28 is a section view of the mounting track taken at approximately 21—21 of FIG. 9.

Referring to FIG. 28, mounting track 14 further comprises a plurality of electrical conductors in the housing 176. The electrical conductors comprise a first power conductor 194, mounted in the channel of first longitudinal conductor channel 182.1 and a second power conductor 196 mounted in the second longitudinal conductor channel 182.3, and a third communication conductor 198 mounted in third longitudinal channel 182.5. The conductors respectively extend the length of the housing 176.

Figure 29:
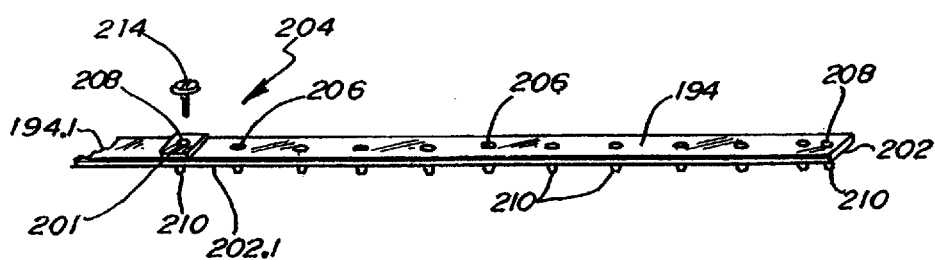
FIG. 29 is a perspective view of first power conductor removed from the mounting track.
Figure 30:
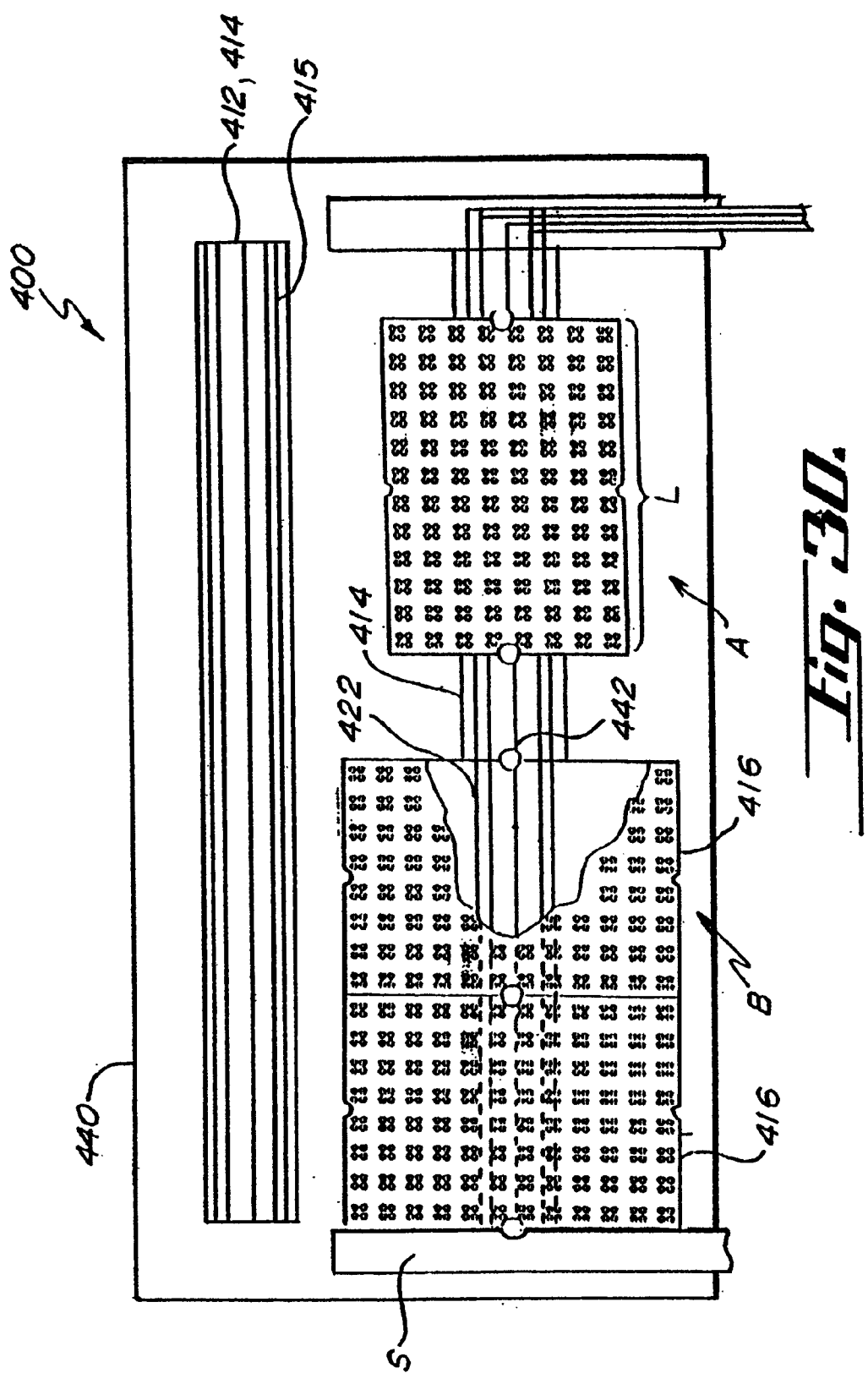
FIG. 30 is a schematic of a second embodiment of the modular sign assembly of the present invention.
Figure 31:
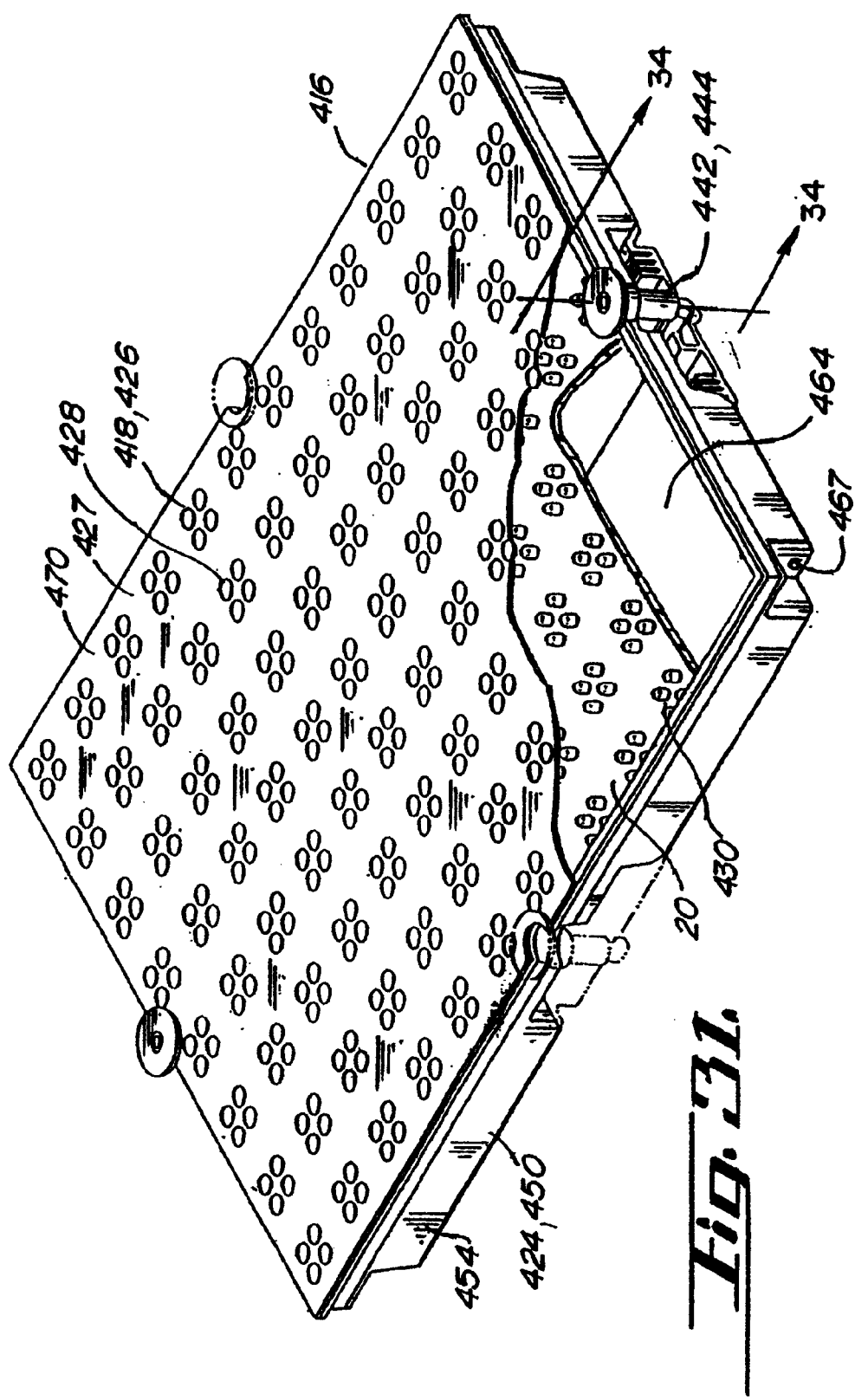
FIG. 31 is a top perspective view of an interchangeable display unit of the second embodiment, with some structure broken away. One of the two attachment points is shown in phantom, indicating that the display unit 416 may be attached to the support member 414 in either of two orientations.
Figure 32:
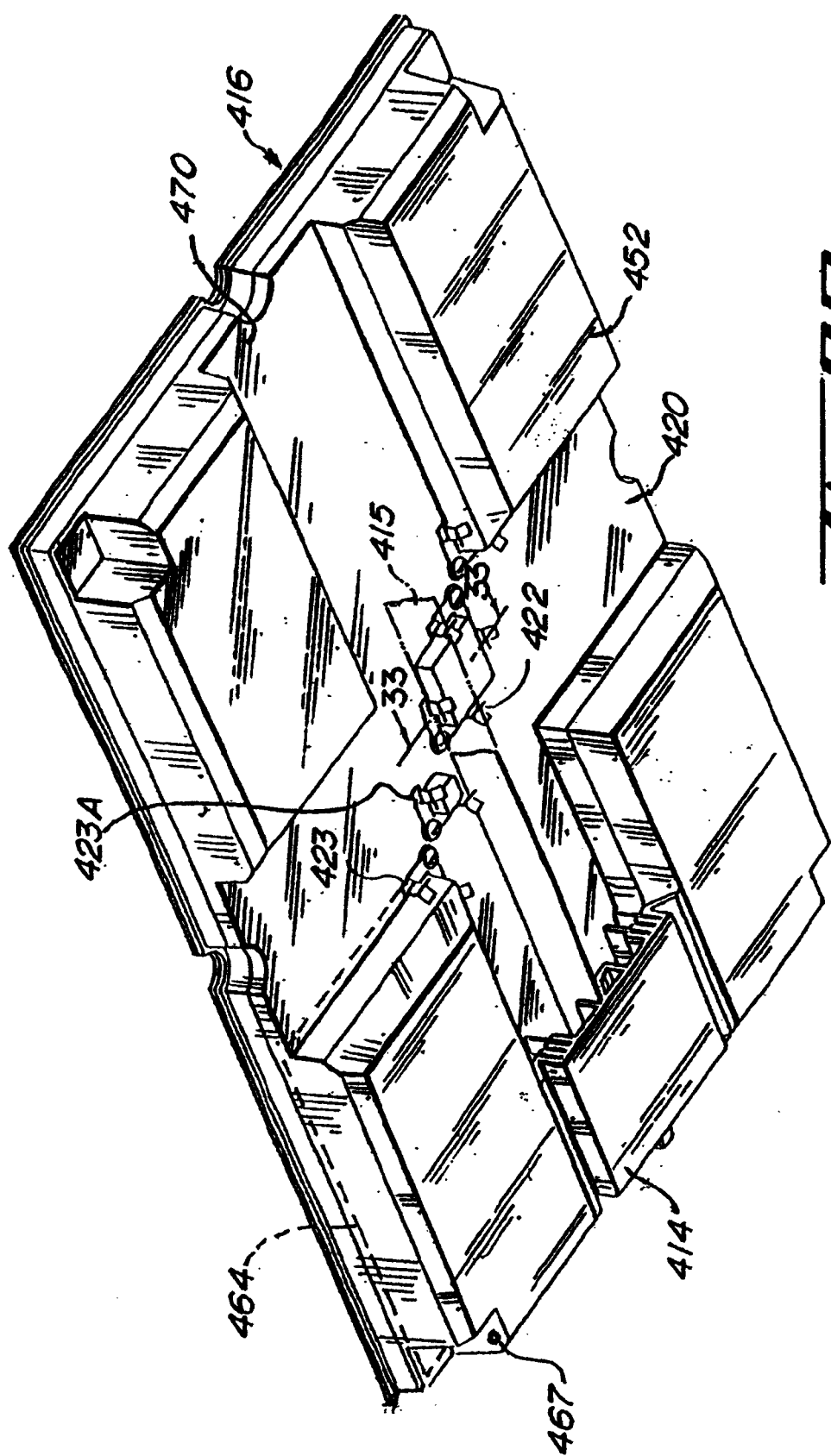
FIG. 32 is a bottom perspective view of an interchangeable display unit of the second embodiment, showing attachment to one conductor.

Referring to FIG. 29, the first power conductor 194 will be described for purposes of illustration. The second conductor 196 and the communication conductor 198 are structurally identical to the first power conductor 194 but may have different spacings between mounting holes 206. The first conductor 194 has a first end 201 and a second end 202. The first end 201 may have an offset portion 204 to allow for overlap and connection to the second end 202 of an adjacent first power conductor 194.1.

Figure 25:
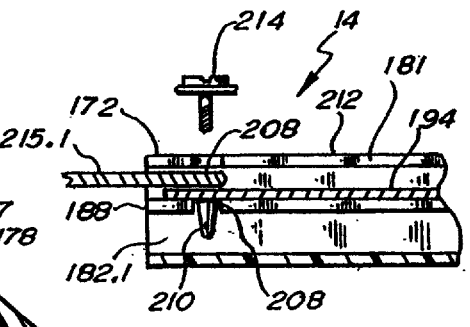
FIG. 25 is a section view taken at approximately 18—18 of FIG. 16.

Alternatively as illustrated in FIGS. 23 and 25, first power conductor 194 may not have offset portion 204. Continuing to refer to FIG. 29, a plurality of mounting holes 206 are formed along the length of the first power conductor 194. The mounting holes 206 in the first power conductor 194 are each spaced a predetermined distance from the first end 201. The predetermined distance of the spacing of the mounting holes 206 of the first power conductor 194 match the predetermined pattern of the fastener holes 193 in housing cover portion 180 illustrated in FIGS. 16 and 23. Each mounting hole 206 in the first power conductor 194 is coaxially aligned with fastener hole 193 extending through the housing cover portion 180 into the first longitudinal conductor channel 182.1. It should be understood, the fastener hole 193 serves to facilitate proper position of the display module 12 along mounting track 14 by receiving the neck 143 of the standoff 134. The fastener hole 193 also allows the knurl face 152 of the standoff 134 to bear against the first power bar 194 forming an electrical and mechanical connection as illustrated in FIG. 17.

A conductor joining hole 208 may be formed in the first end 201 and the second end 202 of the first power conductor 194. A self-clinching fastener 210 is mounted in each mounting hole 206 and may be in the connecting joining holes 208 in the first and second ends 201 and 202 respectively of the first power conductor 194. The self-clinching fasteners 210 in the first power conductor 194 extend into the fastener chamber 190 of the first longitudinal conductor channel 182.1 as illustrated in FIG. 17.

Referring to FIGS. 17, 23 and 29, the track 14 may be formed of a plurality of track segments 172 mechanically and electrically joined together. First power conductor 194 may join to an adjacent first power conductor 194.1 of a second track segment 212 by slidably aligning the offset portion 204 of the first power conductor 194 to coaxially align the conductor joining hole 208 in the offset portion 204 of the first power conductor 194 with the conductor joining hole 208 in the second end 202.1 of the first power conductor 194.1 of the adjacent second housing 212 having a self-clinching fastener 210 mounted therein. A conductor joining screw 214 is threadably inserted through the conductor joining hole 208 of the offset portion 204 of the first power conductor 194 and into the self-clinching fastener 210 in the conductor fastener hole 208 in the first power conductor 194.1 in the second track segment 212 to provide a mechanical and electrical connection.

Referring to FIGS. 23 and 25 first and second ends 201, 202 respectively may be recessed inside mounting track segment 212. In this embodiment link 215.1 having a conductor joining hole 208 in each end is inserted into the channel to coaxially align one conductor joining hole 208 in link 215.1 with the conductor joining hole 208 in first power conductor 194 having a self-clinching fastener 210 mounted therein. Conductor joining screw 214 is mounted through the conductor joining hole 208 in link 215.1 and threadably connected to the self-clinching fastener 210 in the conductor joining hole 208 in first power conductor 194. The link 215.1 is similarly connected to the adjacent first power conductor 194 in the second mounting track segment 172.

Referring to FIGS. 16, 23 and 28, a longitudinal jumper chamber 213 may also be formed longitudinally in the housing 176 generally parallel to the longitudinal conductor channels 182. A slot 215 is formed longitudinally in the housing cover portion 180 extending through the cover plate 181 and into the longitudinal jumper chamber 213 along the length of the track segment 172. A plurality of jumpers 216 are slidably inserted into the longitudinal jumper chamber 213.

The display modules 12 may be mounted on the mounting track 14 using the mounting screws 160. As illustrated in FIG. 17, the display module 12 is positioned on the mounting track 14 to axially align the neck 143 of each standoff 134 in a fastener hole 193 in the mounting track 14. The mounting screw 160 extends from the cover face 148 of the translucent cover 112 and threadably engages the self-clinching fastener 210 in a fastener hole 193 in the first power conductor 194 to compress the standoff 134 forming mechanical and electrical connection.

Referring to FIGS. 17 and 18, the neck 143 of the standoff 134 extends through the housing cover plate 181 and spaces the knurl face 138 a distance from the back side 26 of the circuit board 20. Knurl face 138 of the standoff 134 bears against the first power conductor 194 adjacent to the fastener hole 193, containing the self-clinching fastener 210 threadably engaged by the mounting screw 160. The knurl face 138 has splines 226 extending therefrom, illustrated in FIG. 19, to penetrate the first power conductor 194 to form a mechanical, and electrical connection. The connection is formed between the power connector of the display module 12, and the power conductor when the mounting screw 160 is tightened to bear against the cover face 148 of the standoff 134 and compress the standoff 134 between the driving head of the mounting screw 160 and the power conductor. It should be understood, the self-clinching fastener is attached to the bottom of each conductor in the mounting track 14. This allows the top portion of each conductor to interface with the knurl face 138 of the standoff 134 providing a mechanical and electrical connection.

Figure 13:
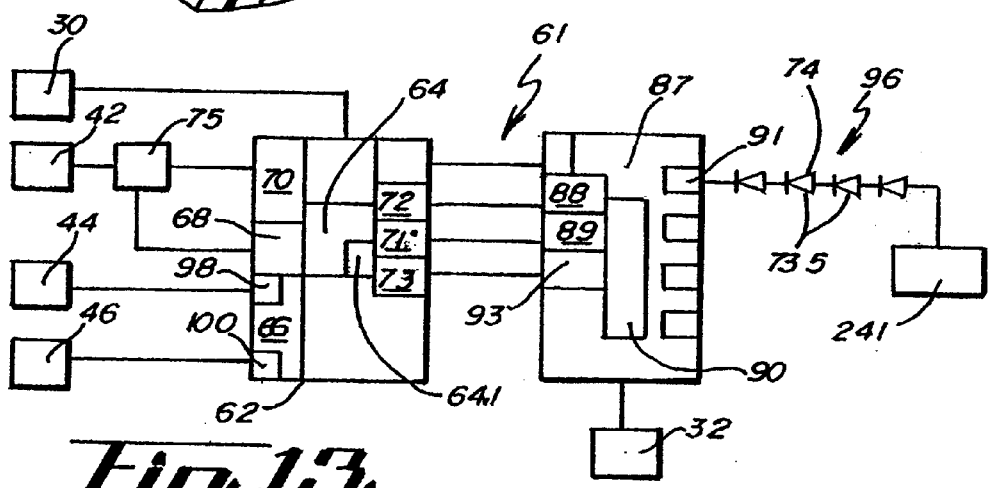
FIG. 13 is a schematic block diagram of the circuitry in a display unit.

Referring to FIG. 13, the circuitry 61 in the display module 12 is configured distribute the processing of the sign and to make each display module 12 individually addressable, interchangeable with other display modules and to display information received from the sign controller 18. The circuitry 61 comprises a microprocessor 62 having a memory 64 for storing an address of the display module and for storing bit map information of several images to be displayed on the display module 12, an addressing portion 66, a signal receiver portion 68, and a signal generator portion 70, a strobe portion 71, message output portion 72, and an output enabler portion 73. The memory 64 of the microprocessor 62 is in communication with the addressing portion 66, the signal receiver portion 68 and the signal generator portion 70. The signal receiver portion 68 and the signal generator portion 70 are in communication with a signal buffer 75 connected to the first communication connector 42. The addressing portion 66 of the circuitry 61 is connected to the reset connector 44 and the reset 46. A light driver 87 is connected to the microprocessor 62 and may be a 32 bit shift register having a plurality of outputs 91, controlled by flip-flops 90. The microprocessor 62 may be an 8021 type having a flash memory as part of the circuitry. Signal buffer 75 may be a Schmitt trigger to buffer data received from the sign controller 18 and facilitate communication from the microprocessor 62 to the sign controller.

Each light driver 87 has a message input 88, a strobe input 89, a power connector connected to the second power connector 32 on the circuit board 20, a flip-flop memory 90 and a plurality of drive transistors. A power input 93 on the light driver 87 is connected to the drive transistor on the light driver 87 and to the output enabler portion 73 on the microprocessor 62. The message input 88 of each light driver 87 is connected to the memory 90 in the light driver 87 and to the message output portion 72 on the microprocessor 62. The drive transistors are connected to the light emitting diodes 74 by an electrically conductive circuit board trace. Each drive transistor controls a display element 96 comprising one or more light emitting diodes 74 in the matrix 76. The display element 96 may comprise four (4) light emitting diodes 74.

Referring to FIG. 13, an addressing input 98 on the microprocessor 62 is in communication with the addressing portion 66. The addressing input 98 may be connected in the circuitry 61 and is in communication with the connector 44. The microprocessor 62 further comprises addressing output 100 connected to connector 46.

Figure 14:
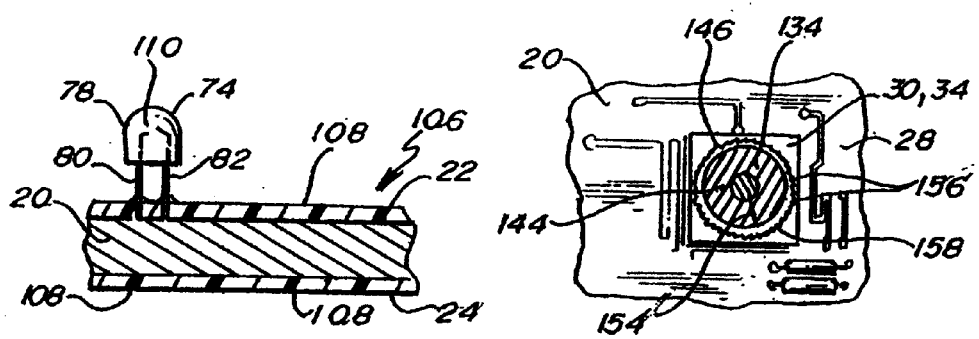
FIG. 14 is a cross section view showing a single light emitting diode mounted on the circuit board, and showing the conformal coating.
Figure 26:
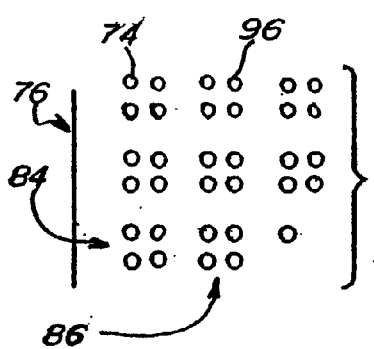
FIG. 26 is a section view taken at approximately 19—19 of FIG. 3 illustrating the first matrix pattern.

Referring to FIG. 14, a plurality of visually distinguishable indicators such as light emitting diodes 74 are mounted on the display side 22 of the circuit board 20 in a pattern. Each light emitting diode 74 comprises a body 78, a first and a second flexible electrical connection 80, 82 respectively. The body 78 of the light emitting diode 74 is spaced from the display side 22 of the circuit board 20. The first and second flexible electrical connectors 80, 82 respectively, allow alignment of the body 78. The light emitting diodes 74 may be arranged in a first matrix pattern 76 as illustrated in FIG. 26. The first matrix pattern 76 having a number of rows 84 and columns 86. The light emitting diodes 74 may also be equally spaced from adjacent light emitting diodes 74 along each row 84 and column 86. The light emitting diodes 74 may be single color emitting white or yellow light or may be a color LED having a red, blue and yellow light source therein.

Referring to FIG. 14, the display module further comprises a sealing envelope 106 to isolate the circuit board 20 and the circuitry 61 from environmental elements such as moisture. The sealing envelope 106 may comprise a conformal coating 108 applied to the circuit board 20. As is well known in the art of sealing circuit boards 20, after the elements have been fastened to the circuit board 20, the circuit board 20 is dipped or sprayed with a polymer 108 to coat and isolate the circuit board 20 and the attached elements from the environment. It should be noted, as shown in FIG. 14, the spacing of the body 78 of the light emitting diode 74 from the display side 22 of the circuit board 20, allows adjustable alignment of the body 78 for pointing the light source 110 inside the light emitting diode 74 at a predetermined target by bending the flexible electrical connectors 80, 82 on light emitting diode 74. This spacing of the body 78 of the light emitting diode 74 also allows the conformal coating 108 to coat the flexible electrical connectors 80, 82 respectively.

As illustrated in FIG. 10, the sealing envelope 106 may also comprise a translucent cover 112 sealingly attached to the display side 22 of the circuit board 20. The translucent cover 112 has a lens portion 113 and an edge channel 114 shaped to fit over the exterior edge portion 26 of the circuit board 20. The lens portion 113 extends over the display side 22 of the circuit board 20. A sealant such as silicone, potting fluid or a similar material may be applied to the exterior edge portion 26 of the circuit board 20 and the interior side of edge channel 114 on the translucent cover 112 to sealingly attach the translucent cover 112 to the circuit board 20. The lens portion 113 of the translucent cover 112 has an inside surface 117 and an outside surface 118 as illustrated in FIG. 17. The translucent cover 112 may have a design 115 silk screened on the lens portion 113 to further enhance the light produced by the light emitting diodes 74 on the display side 22 of the circuit board 20. The design may be a masking of the space between adjacent light emitting diodes 74 to enhance the visual clarity of each display element 96. Translucent cover 112 has screw holes 119 in the lens portion 113. The screw holes 119 are axially aligned with the first, second, third, fourth and fifth mounting fastener holes 38, 40, 54, 56, 58 respectively in circuit board 20 when translucent cover 112 is on circuit board 20.

Figure 27:
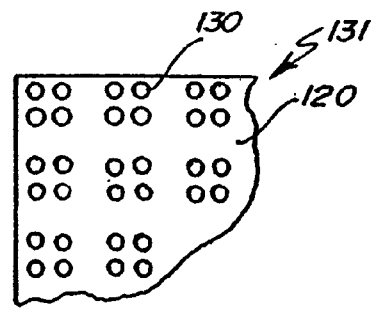
FIG. 27 is a section view of the spacer taken at approximately 20—20 at FIG. 3 illustrating the second matrix pattern.

Referring to FIGS. 10 and 17, the sealing envelope 106 may also comprise a spacer 120. The spacer 120 may be placed between the translucent cover 112 and the display side 22 of the circuit board 20. As illustrated in FIG. 17, the spacer 120 may be of a light blocking, structural, foam having a side on the circuit board 20 and a cover side 126 adjacent to the inside surface 118 of the translucent cover 112. A plurality of LED holes 130 are formed in the spacer 120 to allow each light emitting diode 74 to extend into the spacer 120 and transmit light through spacer 120 and the translucent cover 112. It should be understood, the LED holes 130 in the spacer 120 are arranged in a second matrix pattern illustrated in FIG. 27. The second matrix pattern 131 may be identical to first matrix pattern 76 pattern of the light emitting diodes 74 on the circuit board 20. Mounting fastener holes 132 in the spacer 120 are axially aligned with each of the mounting fastener holes in the circuit board 20 and the coaxial, corresponding screw holes 119 in the lens portion 113 of the translucent cover 112.

Figure 22:
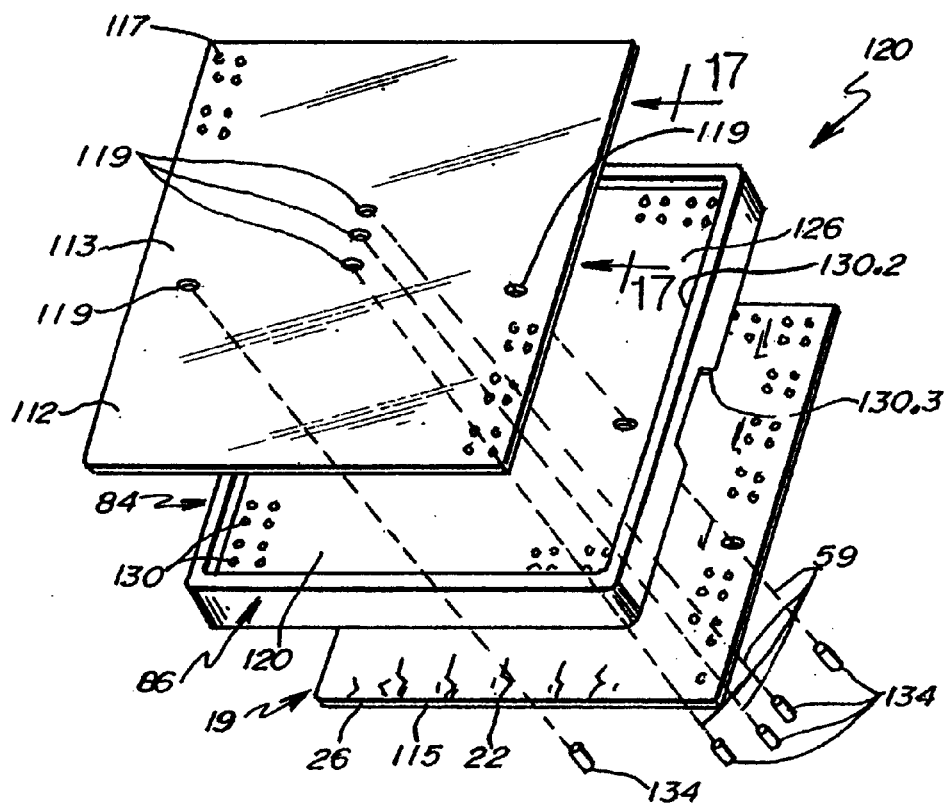
FIG. 22 is an exploded view of a display unit, illustrating an embodiment of the cover and spacer.
Figure 24:
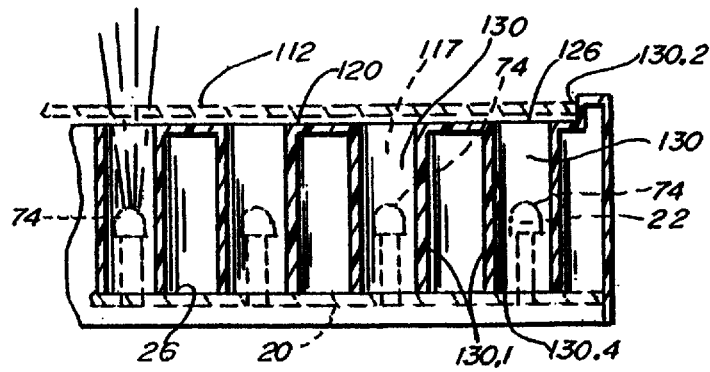
FIG. 24 is a section view taken at approximately 17—17 of FIG. 15.

As illustrated in FIG. 22, the translucent cover 112 may comprises lens portion 113 on the spacer 120. In this embodiment, spacer 120 may be molded of a colored, light absorbing plastic having an edge portion 130.3 to fit over mounting track 14. The LED holes 130 are molded openings in the spacer 120. As illustrated in FIGS. 22 and 24, the LED holes 130 comprise a tubular form extending from the cover side 126 of spacer 120 to the display side 22 on the circuit board 20. Each tubular form has an end opening to receive a light emitting diode 74 positioned adjacent circuit board 20 as shown in outline in FIG. 24. The translucent cover 112 is sealingly attached to the cover side 126 of the spacer 120 in insert depression 130.2 to seal the LED holes from the environment.

Figure 21:
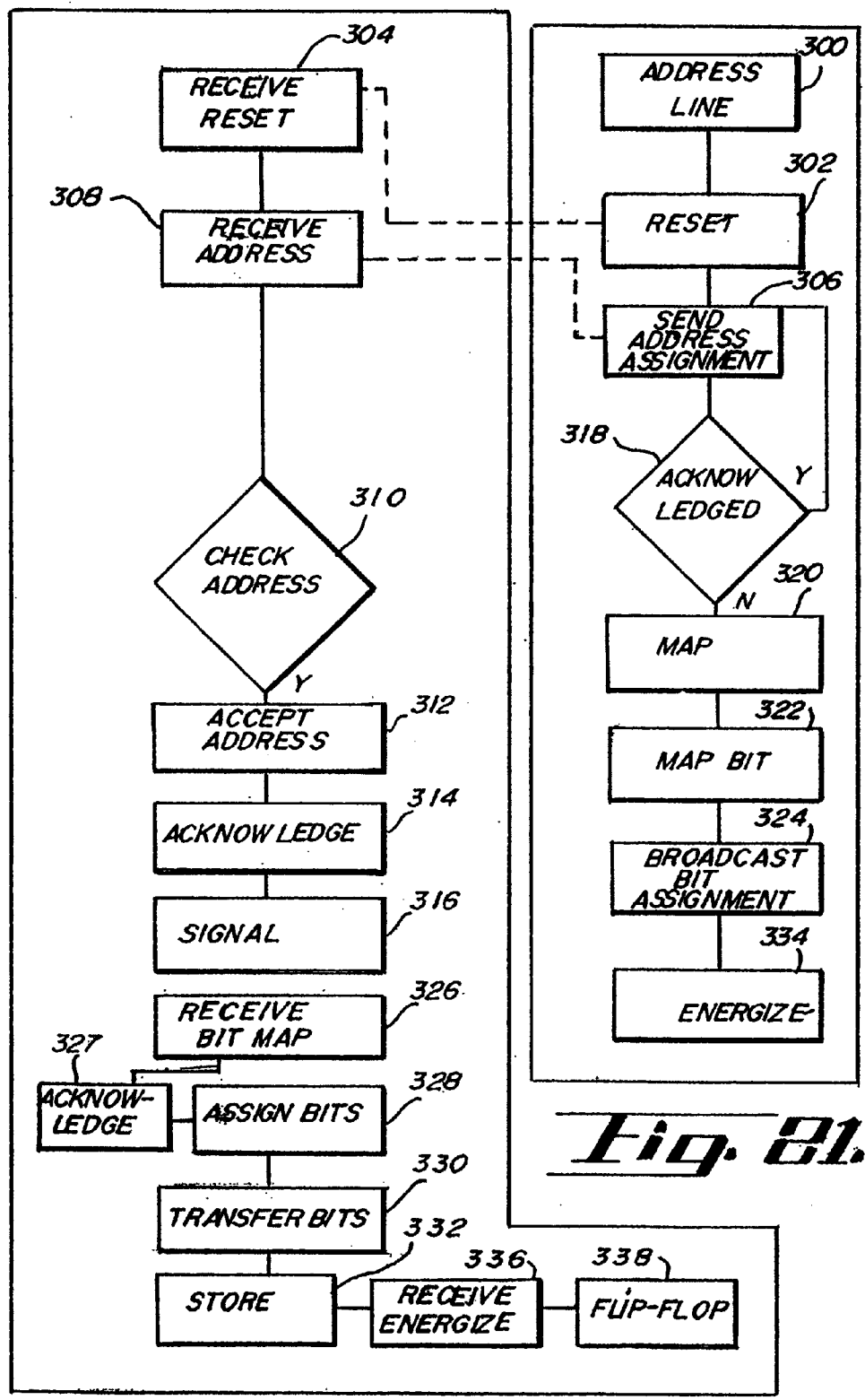
FIG. 21 is a block diagram of the process for operating the modular sign.

As described in FIG. 21, the signal controller 18 performs a sequence of operations illustrated as a block diagram of the process to sequentially address each display module 12 along a particular mounting track 14 and display information on sign 10. Address line block 300 assigns each mounting track 14 an address based on the information output 236 to which it is connected. Reset block 302 broadcasts a reset command to all display modules 12 on each mounting track 14. This reset command is received by the microprocessor 62 in each display module 12 and is communicated to addressing device 66 to nullify any current address assignments.

As illustrated in FIGS. 9, 13 and 21, display modules 12 may be connected to signal controller 18 by reset line 231 in signal controller 18 connected to connector 44. In this embodiment, the command from reset address block 302 resets the address of each display module by signalling the signal controller 18 to send a reset signal on reset line 231 to connector 44. Addressing device 66 in microprocessor 62 in display module 12 receives the reset command. Microprocessor 62 in display module 12 goes into a reset mode when the receive reset block 304 detects the signal and resets address block 302. The reset mode drives address output 100 on microprocessor 62 to a signal high condition. The signal from the address output 100 is communicated to the addressing input 98 in the second display module 228 by jumper 216. The signal from addressing output 100 on first display module 227 causes the microprocessor 62 of the second display module 228 to go into a reset mode. This operation sequentially resets all display modules 12 in each line 254 in sign 10.

After all display modules 12 have had their respective addresses reset, reset address block 302 commands reset line 231 to drop signal the microprocessor 62 in the first display module 227 to change from reset mode to run mode. Send address assignment block 306 broadcasts a display address on communication conductor 198. Display modules 12 receives the broadcast address from sign controller 18 at receive address block 308. Upon receiving a new address, microprocessor 62 in first display module 227 commands the check address block 310 to determine if the first display module 227 has an address. If the first display module 227 has an address, the address received is disregarded by the microprocessor 62 in first display module 227. If the check address block 310 determines the first display module 227 does not have an address, the address is accepted by accept address block 312 and acknowledged by acknowledge block 314. As described above, the adjacent, second display module 228 is still in the reset mode as first display 227 has a signal high condition on address output 100 and across the jumper 215 connecting the second display modules 228. Signal block 316 commands the address output 100 to signal second display module 228 to change from the reset mode to the run mode to receive the next address assignment.

As illustrated in FIG. 21, if an address assignment is acknowledged by acknowledge block 314 in a display module 12, acknowledged block 318 initiates the sending of another address along communication conductor 198. This process is repeated until all displays 12 on mounting track 14 are addressed by signal controller 18.

Alternatively, as illustrated in FIG. 11 and 21, power supply 244 may be connected to the second communication connector 44 on the first display module 227. In this embodiment, reset address block 302 broadcasts an address reset command along communication conductor 198. All display modules 12 connected to communication conductor 198 reset their address. The five volt signal from power supply 244 is received by first display module 227 at addressing device 66 illustrated in FIG. 13. Addressing output 100 is commanded to be set out zero volts.

Send address block 306 broadcasts an address signal having an address on communication conductor 198. Receive address block 308 in display module 12 receives the address from computer 230. Check address block 310 checks for the five volt signal at addressing input 98 illustrated in FIG. 13. If there is a signal at addressing input 98, check address block 310 determines if the first display module 227 has an address. If no address is assigned to the first display module 227 and the address input 98 is receiving the five volt signal, accept address block 312 accepts the address from computer 230 and assigns it to the first display module 227. Acknowledge address block 314 acknowledges the receipt and assignment of the address to computer 230 by signalling along communication conductor 198. Signal block 316, in this embodiment, gives a high signal command to address output 100 to address input 98 of the second display module 228.

The acknowledge block 314 sends an address assignment acknowledgement through signal generator 70 back to computer 240 to acknowledge the receipt of the address which was broadcast. Address assignment block 306 in the computer 230, broadcasts another address assignment command for the next address along communication conductor 198. Again, the second display module 228, having no address assignment, receives the address broadcast.

The check address block 310 checks to determine if the address input 98 is receiving a signal from first display module 227 and determines if the second display module 228 has a current address. If the conditions are correct, check address block 310 signals accept block 312 to receive the broadcast address. Acknowledge block 314 sends an address response from microprocessor 62 at signal generator 70 along communication conductor 198 to computer 230. Address assignment block 306 in computer 230, repeats for adjacent display s 12 until computer 230 does not receive an address acknowledgement.

After addressing each display 12, sign controller 18 prepares to display information. Map block 320 creates a map of the addresses, in each display 12 in sign 10, in the memory 232 of computer 230. Map bit block 322 manipulates the information to be displayed to create a display bit map for each addressed display module 12. Map bit block 322 attaches the address of each display module 12 to its corresponding bit map. Broadcast bit assignment block 324 broadcasts a control signal having a packet of information containing the address and the appropriate display information for each display module 12. this control signal is transmitted from information output 236 along communication conductor 198. Receive bit map block 326, in each display module 12, receives the bit map corresponding to the address of the particular display module 12. This bit map information is stored in the memory 64 of the display module 12.

As described in FIG. 21, the microprocessor 62 in the display module 12 performs a sequence of operations to display the information sent from signal controller 18. The acknowledge block 327, in the display module 12, acknowledges the receipt of the bit mat by the display module 12. The assign bits block 328 engages the microprocessor 62 to examine the bit map contained in memory 64 in the display module 12. Each bit in the bit map is assigned to a corresponding display element 96 on the display module 12. Transfer bits block 330 transfers the bit map information from memory 64 to message output portion 72 and to message input 88 of light driver 87. The store block 332 in light driver 87 stores bit map information in memory 90 of light driver 87. Broadcast energize block 334 in signal controller 18, commands an energize command on communication conductor 198 to affect the control of drive transistors 92. As should be understood, the sending of information from signal controller 18 through microprocessor 62 in display module 12 to light drivers 87 may require a period of one to ten seconds.

As should be understood, the information on the sign 10, should not be changing as information is received by each individual display module 12. To overcome this, the signal controller 18 transfers information to each display module 12 until all the display information is available in the memory 90 of the light drivers 87 in each display module 12 in sign 10. When the information is to be displayed, energize block 334, in signal controller 18, broadcasts an energize signal simultaneously on all information outputs 236 to all display modules 12 in sign 10. The receive energize block 336 in the circuitry in each display module 12 receives the energize signal and strobe portion 71 generates a command to strobe input 89 of the light driver 87. The energize command on strobe input 89 of light driver 87 causes flip-flop block 338 in light driver 87 to transfer the bit map information from the memory 90 to the drive transistors 92. It should be understood, the microprocessor 62 may also use the output enabler portion 73 connected to power input 93 on light driver 87 to energize all drive transistors 92 simultaneously or to brightness of the display elements 96 by pulse width modulation of power supplied to the light driver 87.

The bit map contains a bit as a 1 or 0 corresponding to each display element 96. If the bit is 1, the display element 96 may be illuminated. Upon being energized, each display element 96 attached to a drive transistor 92 is illuminated if the appropriate bit map information sent from signal controller 18 corresponds to that particular display element 96. The bit map causes the drive transistor 92 to supply power to light emitting diode 74 to illuminate the display element 96.

In the event a display module 12 should fail, the signal controller 18 will detect the failure by the display module 12 because the failed display module 12 will not acknowledge the next bit map from broadcast bit assignment block 324. The signal controller 18 may automatically request maintenance by signalling an operator with a information output. The circuitry 61 in each display module is also comprises a diagnostic portion 241 shown in FIG. 13. This diagnostic portion 241 allows the circuitry 61 to cycle each display element on and off to diagnose the operability of each light emitting diode 74 in the circuitry 61.

To remove a display module 12, the power supply 244 is disconnected to remove power from the sign 10. The failed display module 12 is removed from the mounting track 14 by disengaging all mounting screws 160 from the mounting track 14 and replaced with a new interchangeable display module 12. Upon energizing power supply 244, computer 230 will automatically readdress each display module 12 in sign 10 as described above.

The display modules 12 may also be disassembled from sign 10 and reassembled onto a new mounting structure 16 in a new configuration. Computer 230 will readdress the new sign 10 and display information.

Another embodiment of the invention is shown in FIGS. 30–34. In this embodiment, a modular sign assembly 410 comprises an elongate member 412 which further comprises a support member 414 and a plurality of lengthwise conductors 415 extending lengthwise along the support member 414. Preferably, the conductors 415 are constructed of stock copper flat bar with tin/lead plating for corrosion resistance.

The modular sign assembly 410 also comprises a plurality of enclosed, interchangeable display modules 416, each with a generally rectangular front side 418 and opposite back side 420. The display modules 416 are engageable sequentially along the support member 414 at the back side 420. Each display module 416 is electrically connectable to the lengthwise conductors 415 by a plurality of connectors 422.

Each display module 415 further comprises a housing 424 having a back side 420 and a front side 418. The front side 418 preferably includes a front panel 426, the front panel 426 having a plurality of light transmitting windows 428. A plurality of light emitters 430 is enclosed in the housing 424 preferably adjacent to the windows 428 on the front side 426.

The display module 415 also comprises a microprocessor 62 and associated electronics as previously described. The microprocessor 62 controls each light emitter 430. The microprocessor 62 is electrically connected to the connectors 422 for connecting to the conductors 415.

The lengthwise conductors 415 preferably have exposed contact surfaces 432 and the display modules 416 electrically connect to the conductors 415 by way of direct engagement with the exposed contact surfaces, as shown in the Figures.

The modular sign assembly 410 also may comprise a mounting structure 440 for mounting the support member 414, a platform 258, and means 263 for attaching the mounting structure 440 to the platform 258, as previously described.

The modular sign assembly 410 also preferably includes a sign controller 18, as previously described. The sign controller 18 is in communication with each display module 416. The modular sign assembly 410 has means 198 for sending control signals from the sign controller 18 to each display module 416 for controlling the selection of light emitters 430 for illumination. It should be understood that one of the conductors 415 is the communications conductor 198.

In the preferred embodiment, the light emitters 430 are light-emitting diodes 74, as previously described.

The microprocessor 62 further comprises display module circuitry 61 with a memory 64 for receiving and retaining a display module address, as previously described. This makes each display module 416 individually addressable. The memory 64 may hold at least one bit map for controlling the illumination of particular ones of the light emitters 430, as previously described. Bit maps and address signals are provided to the microprocessor from the sign controller 18 generally as previously described.

In the embodiment shown in FIGS. 30–34, the display modules 416 are connectable to the support member 415 by compression clips 442. Preferably, the compression clip 442 comprises a spring-loaded latch 444 with a locking arm 446 adapted to engage the support member 414. However, any other equivalent compression clip which tensions the display module 416 against the support member 414 could be employed. It should be noted that this aspect of the invention differs from the earlier-described embodiment in that there are no pre-drilled fastener holes 193 in the support member 414 for receiving the clips 442. Instead, the clips 422 may be attached at any point along the support member 442, since the conductors 415 are exposed. Display modules 416 are either attached contiguously or spacers S may be used at any point along the support member 414, as shown in FIG. 23. Spacers S may also be used at the ends of the conductors 415 to make electrical connections with the power supply 244 and sign controller 18. The spacers may also have a microprocessor 62 that responds to addressing signals from the sign controller 18. Special circuitry in the spacer S may monitor the voltage from the power supply 244 to vary the brightness of the light emitters 430 and to respond to varying voltage in solar powered systems.

In the embodiment shown in FIGS. 30–34, the connectors 422 further comprise clips 423 on the back side 420 engaging the conductors 415 and adapted to be pressed onto the conductors 415. Preferably, the clips 423 are spring clips 423A. However, any sort of clip could be used which makes a frictional engagement with the conductor 415. Preferably, the clips 423 are constructed of beryllium copper with a bright acid tin plating for corrosion resistance. The beryllium copper has a good memory such that numerous insertions of the display module 416 on the conductors 415 may be made without reducing the retention force.

The support member 414 may preferably be constructed of a non-metallic material, most preferably extruded vinyl. This saves weight and is made possible through structural support from the mounting structure 440.

Figure 33:
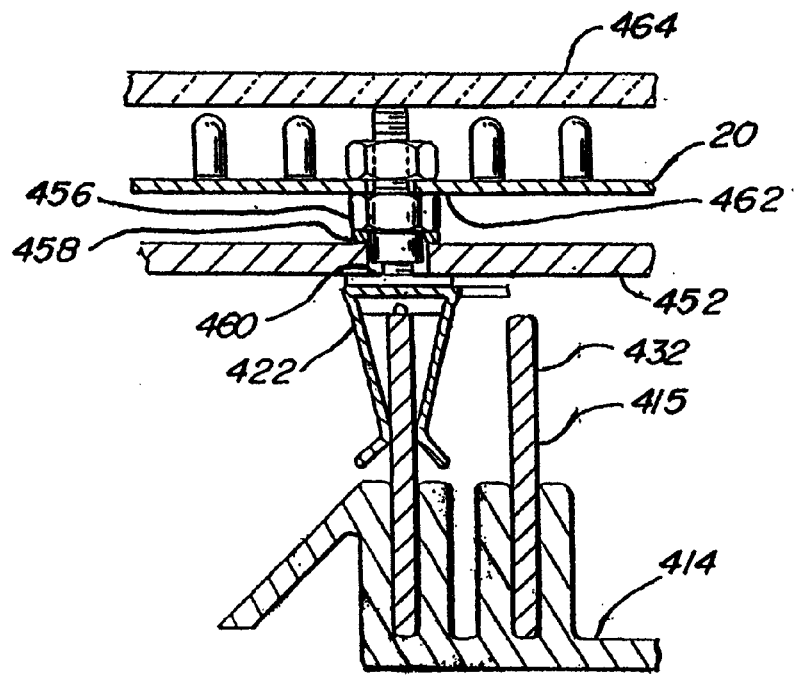
FIG. 33 is a cross-section along the lines 26 in FIG. 25.
Figure 34:
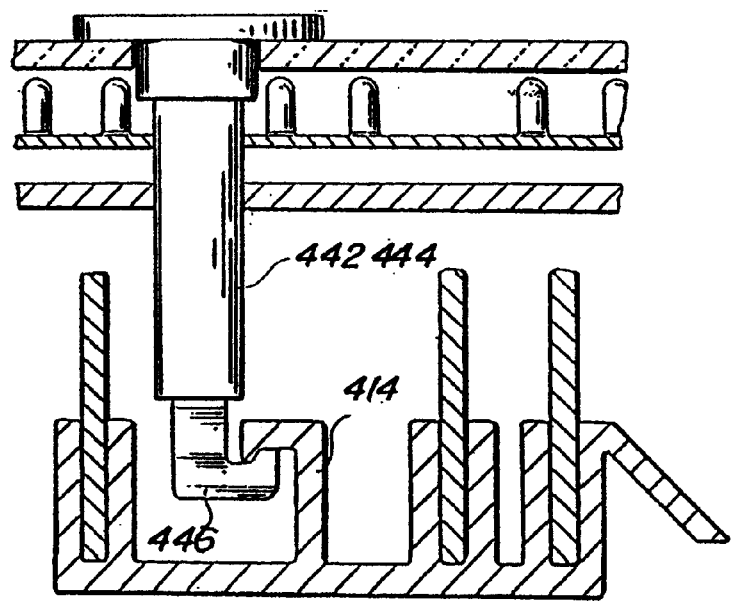
FIG. 34 is a cross-section along the lines 27 in FIG. 23.
Figure 37:
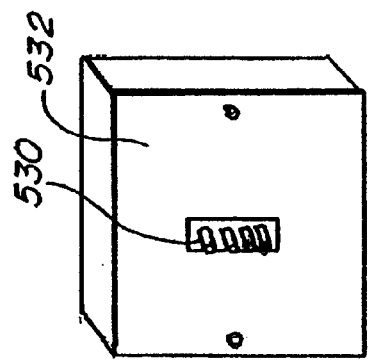
FIG. 37 is a rear perspective view of a display module according to the invention.
Figure 38:
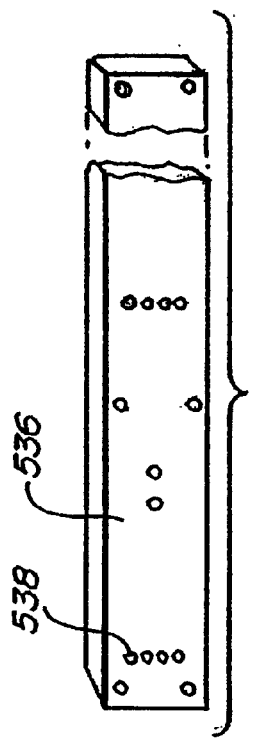
FIG. 38 is a perspective view of a mounting track according to the invention.

The display module 416 preferably comprises an open pan 450 having a bottom 452 and sides 454. A circuit board 20 holds the light emitters 430. As best seen in FIG. 33, a plurality of standoffs 456 mount the circuit board 20 to the bottom 452 of the pan. A plurality of rubber gaskets 458 make a seal between each standoff 456 and the pan 450. A first electrical contact area 460 on each standoff 456 engages the electrical connector 422. A second electrical contact area 462 on each standoff 456 engages the circuit board 20. The front panel 426 comprises a translucent cover 464 enclosing the pan 450 and the circuit board 20. The translucent cover 464 engages the standoffs 456 as shown in FIG. 33, thereby preventing the cover 464 from crushing the light emitters 430 if pressure is applied to the cover 464. It has been found that a person may stand on the cover 464 without crushing the light emitters 430.

In another aspect of the invention shown in FIGS. 30–34, the front panel 426 has a front side 427. Preferably, the front panel 426 is an ultraviolet-resistant polycarbonate material.

An opaque material 470 is painted on the front side 427 to decrease glare from the front panel 426. The windows 428 are arranged in the opaque material 470, corresponding to the light emitters 430. In this manner, the contrast between the light emitters 430 and the sign assembly 410 is maximized. Preferably, the opaque material 470 is painted on the front side 427 by silk-screening, although any other painting method may be used. The ink used to paint the opaque material is preferably dark black to maximize contrast and minimize glare from the front panel by creating a low-gloss finish.

In another aspect of the embodiment shown in FIGS. 23–27, the display modules 416 are mountable to the support member 414 in a first orientation (A, FIG. 23) with the length L parallel to the support member 414 and in a second orientation (B, FIG. 23) with the width W parallel to the support member 414. In this manner, higher letters may be displayed on the display modules 416 (orientation B). Also, the display units may be arranged in columns or rows. In this aspect of the embodiment, the clips 423 are arranged along both the length L and the width W, as best seen in FIG. 25. This arrangement of the clips 423 allows mounting of the display unit 416 in either orientation.

In another aspect of the embodiment shown in FIGS. 30–34, the display units 416 are hermetically sealed. An adhesive covers the top of the sides 454 of the pan 450 and permanently seals the cover 464 to the pan 450. This differs from the previously described embodiments in which screw holes 119 penetrate the translucent cover 112 to allow the display unit to be fastened to the support member. In the embodiment shown in FIGS. 30–34, there are no screw holes in the translucent cover 464 because the display unit 416 is mounted to the support member 414 by the clips 423 on the back side of the display unit 416. The standoffs 456 are sealed by gaskets 458. Hermetic sealing is important to prevent moisture from entering the display unit 416. A desiccant may be placed within the display unit 416 to absorb any moisture which does enter.

In another aspect of the embodiment shown in FIGS. 30–34, the display units 416 have a first mounting channel 470 in the back side 420. The first mounting channel 470 engages the support member 414. The first mounting channel 470 also serves to strengthen the housing 424 by forming a structurally strong area within the back side 420 of the housing 424. This allows the housing 424 to be made of a light weight material such as plastic. A second mounting channel 472 in the back side 420 substantially perpendicular to the first mounting channel 470 allows the display unit 416 to be mounted to the support member 414 in two substantially perpendicular orientations, as previously described.

It should be understood that the embodiment shown in FIGS. 30–34 operates with the sign controller 18 in the same manner as described previously, with the exception that separate connectors 44, 46 are not used to transmit the reset signal. Instead, the reset signal is transmitted on one of the conductors 415.

Figure 35:
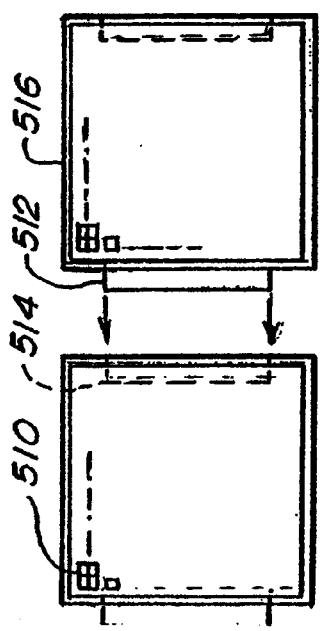
FIG. 35 is a front elevational view of further embodiments of the invention.
Figure 36:
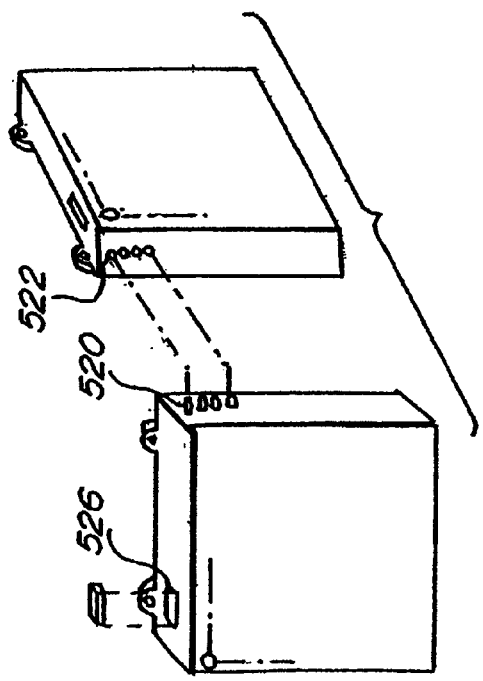
FIG. 36 is a perspective view of further embodiments of the invention.

Referring to FIGS. 35 and 36 alternate embodiments of the invention are depicted. FIG. 36 shows flip panels 510 as the pixel elements and shows structure 512, 514 on the periphery 516 of the display modules for facilitating assembly of adjacent modules. The protruding member 512 can be sized for an interference fit with the recess 514 to secure adjacent modules together.

FIG. 36 depicts the conductors as part of the sign modules rather than utilizing the track members positioned behind the modules. Connector portions 520, 522 comprising male prongs and female receptacles, both on each module, facilitate the data communication and power supply to each module. Also shown are toggle switches 526 which may be used to facilitate addressing manually each individual module. Covers 528 may secure the switches after setting. Simple fastening lugs 530 can be used to attach the modules to a suitable support structure such as a wall, existing sign, or a specifically designed support structure.

Figure 42:
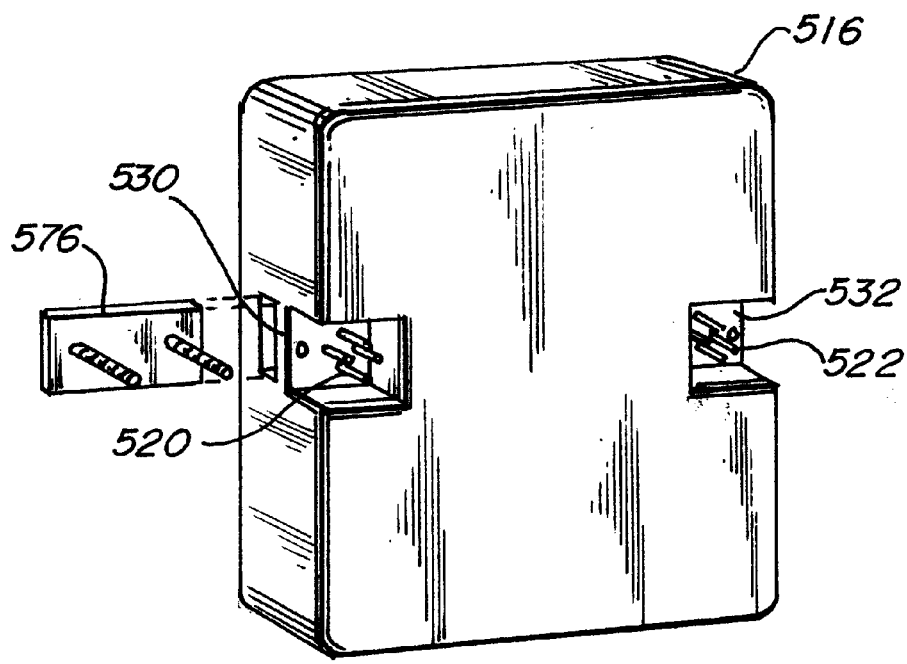
FIG. 42 is a perspective view of the backside of a display module of the sign of FIG. 41.
Figure 43:
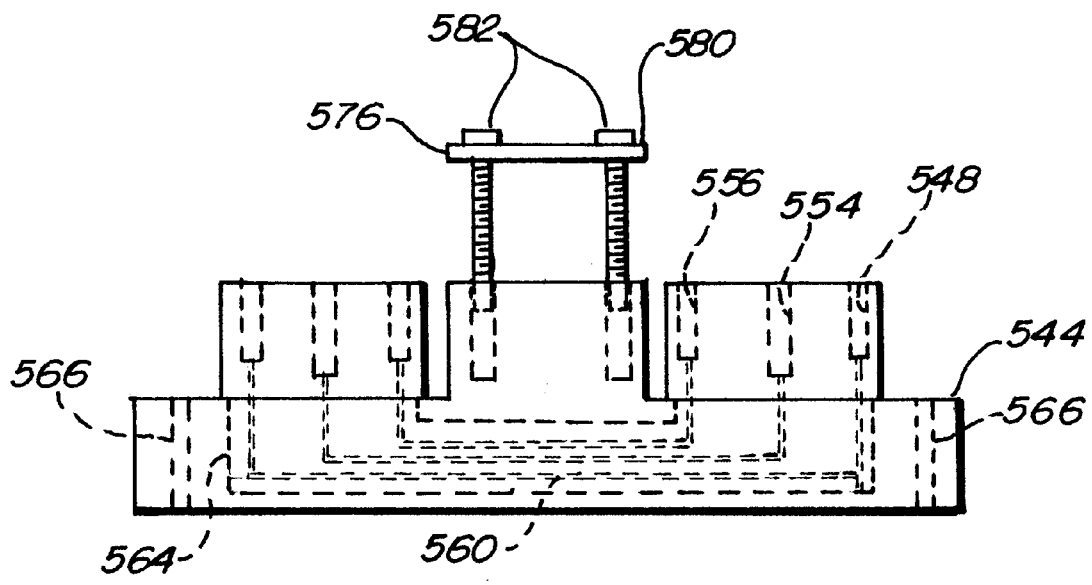
FIG. 43 is a elevational view of a double connector unit of the sign of FIG. 41.

Referring to FIGS. 40, 41, and 42, a further embodiment of the invention is illustrated and is generally indicated with the numeral 500. This embodiment comprises a support structure 502, illustrated as a conventional metal highway sign structure, a connecting system 508, a sign controller 512 with a power supply 514, and display modules 516. The display modules each have left and right connector portions, 520, 522, and further have a pair of clampable portions 530, 532 that are illustrated as positioned adjacent the connecting portions. Rather than utilizing a track as the connecting system, as described in the embodiments presented previously herein, other connective components may also capture the essence of the invention.

The connecting system 508 is comprised of a plurality of connector units 540, configured as single or double units as appropriate depending if they placed at the juncture of two display units or at the edge of a single unit as illustrated in FIG. 40. FIG. 42 illustrates a double connecting unit 544. The connector units are appropriately made from plastic materials such as high density polyethylene or other injection moldable or machineable plastics. The double block has a plurality of connector portions 548 that cooperate with the connector portions 520, 522 on the display modules. The connector portions include a power connector 554 and data connectors and the respective connector portions of each side of the double connector unit are connected with conductors 560 positioned in a wireway 564 in the connector unit. The connector portions may be conventional male/female electrical connectors known in the art. Screw holes 566 may be utilized to attach the connector unit to the support structure 502.

An attachment mechanism 576, shown configured as a plate 580 with screws 582, is utilized to secure the display modules to the connector system and thus to the support structure. In the embodiment illustrated the screw heads are accessible from the front of the display module.

Thus, in the embodiment shown, the data/communication conductors, and the power conductors extend through each module. A jumper cable for addressing may be included in the double connector unit. The single connector unit 590 may have flexible cable extending therefrom to connect to the sign controller 512 and/or power supply 513. Due to the current requirements for a large number of display modules, it is contemplated that each row or other grouping of display modules may be supplied separately with power conductors to reduce the size of the conductor. Moreover, it is anticipated that the conventional voltage of 12 to 14 volts d.c. for l.e.d. signage circuit boards may be increased to 48 volts to minimize the power conductor size.

This application is related to the commonly owned application entitled Outdoor Sign with Sealed Sign Module Application Ser. No. 09/139,897, Filed Aug. 26, 1998, which is incorporated herein by reference for the purpose of complete disclosure.

The present invention may be embodied in other specific forms without departing from the spirit of essential attributes thereof; therefore, the illustrated embodiment should be considered in all respects as illustrative and not restrictive, reference being made to the appended claims rather than to the foregoing description to indicate the scope of the invention. Note when elements or components are indicated to be connected or attached herein, use of such terms does not indicated or require direct contact between the elements or components connected or attached. One or more intermediate components or elements may be intermediate the attached or connected element or components.

What is claimed is:

1. A modular sign system for constructing outdoor changeable message signs on a support structure with an exteriorly exposed sign screen of an adjustable size, the system comprising:
   a) a sign controller comprised of circuitry with a data output for providing message data to a selected number of individual display modules through said data output, said selected number being changeable as the screen size is adjusted, said data including specific data for each display module;
   b) a plurality of interchangeable display modules, each display module comprising:
      i) an enclosure having a display side with a sign screen portion, the enclosure positionable next to other interchangeable display modules such that the screen portions are adjacent one another for defining the sign screen;
      ii) a submatrix of changeable pixel elements positioned within the open interior of the enclosure adjacent to the display side, the pixel elements viewable through the display side, the enclosures sized and the pixel elements arranged on each display module to provide an alpha numeric character height capability on each of said individual display modules of at least six inches; and
      iii) circuitry contained with the enclosure and connected to the pixel elements, said circuitry having a data input and being configured for the connecting system configurable for retaining a display module address, for receiving the message data, for distinguishing the specific data corresponding to said display module address, and for operating the pixel elements in accordance with the specific data received from the sign controller, the circuitry sealed within the enclosure whereby each display module is independently protected from the weather;
   c) a connecting system mountable on the support structure defining slots for the attachment of a variable number of interchangeable display modules positioned in a matrix arrangement wherein each display module is exteriorly exposed, the connecting system configurable for additional slots for accommodating additional display modules for expansion of said matrix arrangement, thereby expanding the sign screen and reconfiguring said sign.

2. The sign system of claim 1, wherein the connecting system comprises a plurality of connectors each separately securable to the support structure, each display module is removably attachable to at least one connector.

3. The sign system of claim 2, wherein the matrix arrangement has at least one adjacent pair of display modules and wherein each adjacent pair is attached to the support structure by a connector and wherein the connector has a plurality of conductors for electrically connecting the adjacent conductors.

4. The sign system of claim 2, wherein the matrix arrangement comprises at least three display modules in a row including a middle module, and wherein each module is individually removably fastened to said mounting structure such that each module may be individually removed without removal of adjacent modules.

5. The sign system of claim 1, wherein the connecting system is a track member configured for attachment of a plurality of display modules thereto, the track member including a plurality of conductors therein for providing electrical connection between each display module and the sign controller.

6. The sign system of claim 1, wherein the display module circuitry and the sign controller circuitry are configured to provide alphanumeric characters from 6 inches to greater than 10 inches in height on said screen and are further configured to provide alphanumeric characters that extend across a plurality of adjacently positioned display module screen portions.

7. The sign system of claim 1, wherein the matrix arrangement comprises at least three display modules in a row including a middle module, and wherein each module is individually removably fastened to said mounting structure such that each module may be individually removed without removal of adjacent modules.

8. The sign system of claim 1, wherein each of the display modules has a left side and a right side and wherein each display module further has a pair of connector portions, one on said left side and one on said right side, and wherein the connector portions are configured such that when two display modules are placed side by side, with the left side on one display module adjoining with the right side of the second module, the connector portion on said left side is electrically connectable to the connector portion on said right side.

9. The sign system of claim 8, wherein the connecting system comprises a plurality of connector units each individually mountable on the support structure, the connector units configured for removably mounting the display modules to the support structure, and wherein two display modules are placed side by side, one of said connector units electrically connects the connector portion on one of said side by side display modules to the other of the side by side display modules.

10. A modular sign system for constructing outdoor changeable message signs with an exteriorly exposed sign screen of an adjustable size, the system comprising:
   a. a sign controller comprised of circuitry with a data output for providing message data to a selected number of individual display modules through said data output, said selected number being changeable as the sign screen is adjusted, said data including specific data for each display module;
   b. a plurality of interchangeable display modules, each display module comprising:
      i) a weather resistant enclosure having a display side with a sign screen portion, the enclosure positionable next to other interchangeable display modules such that the screen portions are adjacent one another for defining the sign screen;
      ii) a submatrix of changeable pixel elements positioned within the enclosure adjacent to the display side, the pixel elements viewable through the display side, the enclosure sized and the pixel elements arranged on each display module to provide an alphanumeric character height capability on each of said individual display modules of at least six inches; and
      iii) circuitry contained with the enclosure and connected to the pixel elements, said circuitry having a data input and being configured for retaining a display module address, for receiving the message data, for distinguishing the specific data corresponding to said display module address, and for operating the pixel elements in accordance with the specific data received from the sign controller, the circuitry sealed within the enclosure whereby each display module is independently protected from the weather and the sign controller circuitry and the individual module's circuitry further configured for providing alphanumeric characters which may extend across a plurality of adjacently positioned display module screen portions;

c. a connecting system comprising a plurality of connector units, each connector unit configured for removably securing at least one display module to the support structure, the connector units positionable on the support structure for accommodating a desired number of display modules.

11. A modular changeable message sign with an adjustable screen size, the sign comprising:
   a) a plurality of interchangeable sealed display modules positioned in a matrix arrangement having a rectangular periphery, said matrix arrangement not being constrained within a sign screen enclosure whereby additional display modules may be added to the matrix to increase the sign screen size without opening or entering an enclosure contain the matrix arrangement, each display module comprising:
      i) a front display side with a height of at least eight inches and a width of at least eight inches, the front display side defining an exteriorly exposed screen portion, the screen portions of the plurality of display modules defining an exteriorly exposed sign screen;
      ii) an array of pixel elements positioned at the screen portion of each of said modules, the pixel elements sufficient in number to define at least one complete alphanumeric character within each of the said screen portions; and
      iii) circuitry contained within the module and connected to the pixel elements for operating the pixel elements;
   b) a support structure positioned behind the matrix arrangement of modules, the matrix arrangement attached to said support structure; and
   c) a sign controller comprised of circuitry and configured for communicating with each of the display modules in the matrix, the sign controller further configured for allowing additional display modules to be added to the matrix.

12. The sign of claim 11, further comprising a connecting system wherein the connecting system mounts to the support structure and the display modules are mounted on the connecting system.

13. The sign of claim 12, wherein the sign controller circuitry and the circuitry in each module are serially connected.

14. The sign of claim 13, wherein a plurality of connector units, and wherein the connecting system is comprised of the display modules are serially connected through said connector units.

15. An electronically changeable message sign with an adjustable screen size, the sign comprising:
   a) a plurality of interchangeable display modules positioned in a matrix arrangement having a rectangular periphery, each display module comprising:
      i) a front display side with a height of at least six inches and a width of at least six inches, the front display side defining an exteriorly exposed screen portion, the screen portions of the plurality of display modules defining an exteriorly exposed sign screen, whereby the screen portions of each of the modules are not positioned behind a screen panel;
      ii) an array of pixel elements positioned at the screen portion of each of said modules, the pixel elements sufficient in number to define at least one complete alphanumeric character within each of said screen portions and are of sufficient size to be readable from at least 150 feet in front of the sign;
      iii) circuitry contained within the module and connected to the pixel elements for operating the pixel elements;
   b. a support structure with a front side, the matrix arrangement of modules supported by said support structure on said front side, said modules configured such that each individual module is removable and replaceable without opening a sign enclosure enclosing the matrix arrangement and without accessing the back of the support structure; and
   c. a sign controller comprised of circuitry and configured for communicating with each of the display modules and the sign controller further configured for allowing additional display modules to be added to the matrix.

16. The changeable message sign of claim 15, wherein the mounting structure is adapted to support additional modules and wherein the sign controller is further configured for allowing additional display modules to be added to the matrix for expanding the sign size.

17. The message sign of claim 15, wherein the modules and mounting structure and modules are adapted for attachment and removal of individual modules without removing modules adjacent to said individual module.

18. A method for constructing changeable message signs, said method comprising the steps of:
   a) secure a connecting system to a support structure, the connecting system comprising a plurality of conductors;
   b) electrically connecting a sign controller to the display modules;
   c) selecting a desired number of interchangeable display modules for a desired screen size, each module comprising a weatherized enclosure, a screen portion at least 6 inches by 6 inches, a plurality of changeable pixel elements in the enclosure, circuitry for operating the pixel elements in the enclosure and an electrical connector connecting to the circuitry, said connector fixed with respect to the enclosure; and
   d) connecting the modules onto the connecting system.

19. A method for field reconfiguring the screen size of a changeable outdoor message sign readable from at least 300 feet, said message sign having a plurality of exteriorly exposed display modules positioned in a matrix arrangement defining a sign screen, each module removably connected to a connecting system on a support structure, and in data communication with a sign controller, the method comprising the steps of:
   a) altering the number of display modules attached to the connecting system on the support structure for a new number of modules on said connecting system;
   b) readdressing each of the new number of modules; and
   c) providing data from the sign controller to each individual module by way of the module addresses for activating pixel elements in each module whereby a desired message may be displayed on the sign screen.

20. A method of manufacturing a changeable message sign for outdoor usage in response to a customer request, the method comprising the steps of:

a) maintaining in inventory;

b) selecting from inventory to create a sign of a desired size, a plurality of preconstructed display modules, each module being interchangeable and having a weatherized enclosure with a screen portion at least six inches in height and six inches in width, changeable pixel elements adjacent the screen portion inside the display module, and sealed circuitry for operating the pixels, each display module individually addressable;

c) attaching a connecting system to a sign support structure, said support structure to receive a variable number of display modules and further adapted to allow variable positioning of the display modules;

d) arranging the plurality of display modules on the mounting track in a matrix arrangement to form a sign screen, without a sign enclosure enclosing or containing the sign screen;

e) putting a sign controller in communication with the display modules; and f) addressing each of the display modules in accordance with their respective positions in the matrix arrangement.

* * * * *